(12) United States Patent
Boshoff

(10) Patent No.: US 11,640,226 B2
(45) Date of Patent: May 2, 2023

(54) DISPLAYING INFORMATION OBJECTS BASED ON ELLIPTICAL FRAMES ON A TRACK BETWEEN INNER AND OUTER ELLIPTICAL BORDERS

(71) Applicant: Swirl Design (Pty) Ltd, Stellenbosch (ZA)

(72) Inventor: Hendrik Frans Verwoerd Boshoff, Stellenbosch (ZA)

(73) Assignee: Swirl Design (Pty) Ltd, Stellenbosch (ZA)

( * ) Notice: Subject to any disclaimer, the term of this patent is extended or adjusted under 35 U.S.C. 154(b) by 0 days.

(21) Appl. No.: 16/184,738

(22) Filed: Nov. 8, 2018

(65) Prior Publication Data

US 2019/0146638 A1 May 16, 2019

(30) Foreign Application Priority Data

Nov. 10, 2017 (ZA) .................................. 2017/07612

(51) Int. Cl.
*G06F 3/0482* (2013.01)
*G06F 3/0484* (2022.01)
(Continued)

(52) U.S. Cl.
CPC .......... *G06F 3/0482* (2013.01); *G06F 3/0488* (2013.01); *G06F 3/04845* (2013.01);
(Continued)

(58) Field of Classification Search
CPC ............... G06F 3/0482; G06F 3/04883; G06F 3/04886; G06F 3/04845; G06F 3/0488; G04G 9/007; G04G 21/08
See application file for complete search history.

(56) References Cited

U.S. PATENT DOCUMENTS

2010/0306702 A1* 12/2010 Warner ............... G06F 3/04817
715/811
2013/0104079 A1* 4/2013 Yasui .................... G06F 3/0482
715/834
(Continued)

FOREIGN PATENT DOCUMENTS

WO WO 2017/109687 A1 6/2017

OTHER PUBLICATIONS

Daniel Mentrard; Steiner chain with Geogebra4.2 : https://youtu.be/-XJmDQ_tHVs (Year: 2014).*
(Continued)

*Primary Examiner* — Cesar B Paula
*Assistant Examiner* — Zelalem Shalu
(74) *Attorney, Agent, or Firm* — Fenwick & West LLP

(57) ABSTRACT

A display and interaction method in a user interface and devices, computer program products and systems therefor are disclosed. An information object display area includes a plurality of information objects displayed on a track. The track extends along a path created between an outer and inner elliptical border in the interface. A plurality of elliptical frames are generated along the track, each in contact with the outer and inner elliptical borders, and first and second neighboring elliptical frames adjacent to it. Information objects are displayed based on the elliptical frames. In response to receiving user input associated with movement of a pointer, the center of the inner elliptical border is moved in the direction of pointer movement while resizing the inner border so that it remains within the outer border. The elliptical frames are resized and moved along the track so that all the elliptical frames remain in contact with the borders and their neighboring elliptical frames.

20 Claims, 11 Drawing Sheets

(51) Int. Cl.
*G06F 3/0488* (2022.01)
*G06F 3/04845* (2022.01)
*G06F 3/04883* (2022.01)
*G06F 3/04886* (2022.01)
*G04G 9/00* (2006.01)
*G04G 21/08* (2010.01)

(52) U.S. Cl.
CPC ...... *G06F 3/04883* (2013.01); *G06F 3/04886* (2013.01); *G04G 9/007* (2013.01); *G04G 21/08* (2013.01)

(56) References Cited

U.S. PATENT DOCUMENTS

| | | | |
|---|---|---|---|
| 2016/0048291 A1* | 2/2016 | Boshoff | G06F 3/04842 715/834 |
| 2016/0202866 A1* | 7/2016 | Zambetti | G06F 3/0488 715/835 |
| 2016/0259488 A1* | 9/2016 | Chan | G06Q 30/0643 |
| 2016/0313869 A1* | 10/2016 | Jang | G04G 9/00 |

OTHER PUBLICATIONS

YouTube Video: Title Steiner chain with Geogebra4.2 Link: https://youtu.be/-XJmDQ_tHVs, Author: Daniel Mentrard; Published Year: Sep. 10, 2014 (Year: 2014).*

* cited by examiner

DISPLAYING INFORMATION OBJECTS BASED ON ELLIPTICAL FRAMES ON A TRACK BETWEEN INNER AND OUTER ELLIPTICAL BORDERS

CROSS-REFERENCE TO RELATED APPLICATION

This application claims priority from South African provisional patent application number 2017/07612 filed on 10 Nov. 2017, which is incorporated by reference herein.

FIELD OF THE INVENTION

This invention relates to display and interaction in a user interface. More particularly, the invention relates to a system and method that allows a user to navigate to and locate any one of a plurality of information objects, and interact with the objects to obtain desired information, or to select the object. The invention may be particularly, but not exclusively, suited to small circular displays and to larger displays on which preview objects are to be displayed.

BACKGROUND TO THE INVENTION

Users often check specific information objects on their mobile devices to obtain information that may be periodically updated. The information objects may be time, weather forecasts, exchange rates, share and commodity prices, flight progress, personal health indicators, social media statuses, or the like. Many users may desire to periodically view information about multiple such information objects at one time, preferably with minimal input in locating the desired information objects.

Each information object in which a user is interested may only be visible upon navigation to a specific application providing access to such an object. Such applications may be a clock application, a weather application, a financial indicator application, a flight application, a personal health application, social media application, and the like. To navigate to and open each of the required applications may take a significant time and may require notable input from a user.

Some applications allow what is known as "widgets" to be installed on a display of a mobile device and which provide some information without launching the specific application. These widgets however take up valuable display space, with the result that only a limited amount of information can be displayed to a user, with specific navigation required to switch between display pages that show desired information objects.

On a small display, such as on that of a smart watch, display space may be expected to be particularly limited and the above problems are exacerbated. Navigation may be particularly cumbersome on a smart watch with its associated small display.

It should also be noted that users may have a set number of information objects which they typically require specific information from. In such a case, a user may wish to have only that specific information available to them without being required to launch and open a separate application where such information may be available, which may take a significant time period to reach.

In the remainder of the specification, the term "pointer" should be construed to mean any object interacting with a user interface in order to control it. The pointer may, for example, be provided by a finger of a user or a stylus interacting with a touch-sensitive display associated with a user interface, or may be a pointer displayed on the user interface and controllable by an external input device such as a computer mouse.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with the invention there is provided a computer program product comprising a non-transitory computer readable storage medium having instructions encoded thereon that, when executed by a processor, cause the processor to perform, at a user interface, the steps of:

displaying an information object display area including a plurality of information objects on a track, the track extending along a path created between an outer elliptical border and an inner elliptical border in the user interface, with the inner elliptical border lying within the outer elliptical border;

generating a plurality of elliptical frames along the track, each elliptical frame in contact with the outer elliptical border, the inner elliptical border, a first neighboring elliptical frame adjacent to the elliptical frame and in a first direction along the track, and a second neighboring elliptical frame adjacent to the elliptical frame and in a second direction along the track that is opposite to the first direction;

displaying one or more information objects each based on one of the elliptical frames;

in response to receiving user input associated with movement of a pointer in the user interface:

moving a center of the inner elliptical border in a direction of movement of the pointer while resizing the inner elliptical border so the inner elliptical border remains within the outer elliptical border; and resizing the plurality of elliptical frames and moving at least some of the elliptical frames along the track so that all the elliptical frames remain in contact with the inner elliptical border, the outer elliptical border, the first neighboring elliptical frame, and the second neighboring elliptical frame.

Further features provide for each of the elliptical frames to be associated with a specific location on the track in an original condition of the user interface; for the step of resizing and moving at least some of the elliptical frames to be performed so that elliptical frames that lie along a straight line between the center of the inner elliptical border and a center of the outer elliptical border are in the same location along the track as in the original condition of the user interface.

Still further features provide for the track to be an elliptical track, and for centers of the frames to be located on the track.

Yet further features provide for each of the one or more information objects to be within one of the elliptical frames; for an information object to resize and move corresponding to resizing and movement of the elliptical frame in which the information object is within; for an information object to display different types of information based on a size of the information object; for the method to include the step of updating information displayed by the information object once the information object is resized to a predetermined size associated with a specific type of information; and for there to be at least three types of information displayable by an information object.

Further features provide for the outer border to lie adjacent to or to be defined by a boundary of a circular display; for the circular display to be that of a smartwatch; and for the circular display to be a touch-sensitive display.

A still further feature provides for the step of moving the center of the inner elliptical border in the direction of movement of the pointer to include moving the inner elliptical border so that its center lies on the pointer.

A yet further feature provides for the inner elliptical border to include a clock face associated therewith, and for the clock face to move and resize therewith; alternatively for the clock face to fade out during movement and resizing of the inner elliptical border.

Further features provide for the user interface to remain in a current display state when the pointer is removed from the display for at least a predetermined period of time; for the method to include the step of, responsive to a selection action being performed on an information object, selecting that information object; and for the display to be configured to return to an original state in response to receiving no interaction for at least a predetermined period or to return to the original state at a predetermined rate after removal of the pointer from the display.

Still further features provide for the pointer to be controllable by input received from an input device of an electronic device housing the display; for the electronic device to be a mobile phone; for the electronic device to be a smartwatch; and for the input device to be a touch-sensitive display of the electronic device; alternatively for the predetermined user input to be received from an external input component such as a computer mouse.

The information object display area may be hidden in an original state of the display and may only be displayed in response to receiving the user input associated with movement of the pointer in the user interface; alternatively, the information object display area may be configured to display the information objects therein as very small information objects forming a chain of objects within the information object display area.

When the outer border, inner border and the information objects are circular, they may form a Steiner Chain. The track, outer border, inner border and frames may be hidden from view on the user interface while the information objects are displayed.

A further feature provides for the method to include the step of providing an indicator indicating what point in the information object display area along the outer elliptical border and opposite the center of the inner elliptical border from the center of the outer elliptical border is in the same location as in the original condition of the user interface.

Still further features provide for the method to include the step of receiving updated information relating to an information object; indicating what information object has been updated; for the manner of indicating to be a visual indicator such as a colored notification or flashing objects at the updated information object; and for the manner of indicating to include providing haptic feedback such as a vibration performed by the electronic device associated with the user interface.

An information object may be animated to maximize from its position when selected; and may grow until it covers the entire display or the area enclosed by the outer elliptical border. In some embodiments, a return, back or undo function may be provided, and a maximized information object may be animated to its previous position in its frame when this function is selected.

Further features provide for the method to include the step of, responsive to a selection action being performed on an information object, launching an application associated with the information object on an electronic device associated with the user interface; or on another device (such as a parent device) associated with the electronic device of the user interface. The electronic device may be a smartwatch, and the parent device may be a smartphone.

Still further features provide for the information objects to define hierarchy headings, with selection of a main hierarchy heading information objects causing replacement of the information objects on the display with sub-heading information objects associated with the selected hierarchy heading information object; and for the method to include the step of, responsive to receiving a return input whilst sub-heading information objects are displayed, causing replacement of the sub-heading information objects on the display with main heading information objects.

The method may include the steps of, responsive to a user performing an information object moving action, allowing the user to move the information object to a desired location on the track, and associating the information object with the desired location. During moving of an information object a location of that information object may become darkened to show a user which information object is being moved, and potential locations where the information object may be placed may also be darkened to indicate to a user where the information object may move to.

The invention extends to a device comprising:
  a processor configured to execute computer code including one or more components that include a series of instructions stored on a non-transitory computer readable medium, the one or more components including:
    an information object display area component for displaying a plurality of information objects on a track, the track extending along a path created between an outer elliptical border and an inner elliptical border in a user interface, with the inner elliptical border lying within the outer elliptical border;
    an elliptical frames component for generating a plurality of elliptical frames along the track, each elliptical frame in contact with the outer elliptical border, the inner elliptical border, a first neighboring elliptical frame adjacent to the elliptical frame and in a first direction along the track, and a second neighboring elliptical frame adjacent to the elliptical frame and in a second direction along the track that is opposite to the first direction;
    an information object display component for displaying one or more information objects each based on one of the elliptical frames;
    an inner border moving and resizing component for, in response to receiving user input associated with movement of a pointer in the user interface, moving a center of the inner elliptical border in a direction of movement of the pointer while resizing the inner elliptical border so that it remains within the outer elliptical border; and
    a frame resizing and moving component for, responsive to moving and resizing the inner elliptical border, resizing the elliptical frames and moving at least some of the elliptical frames along the track so that all the elliptical frames remain in contact with the inner elliptical border, the outer elliptical border, the first neighboring elliptical frame and the second neighboring elliptical frame.

Further features provide for the device to include a frame associating component for associating each of the frames with a specific location on the track in an original condition of the user interface; and for the frame resizing and moving component to be configured to resize and move at least some of the elliptical frames so that elliptical frames that lie along a straight line between the center of the inner elliptical border and a center of the outer elliptical border are in the same location along the track as in the original condition of the user interface.

Still further features provide for the device to include an information object resizing and moving component for resizing and moving information objects corresponding to resizing and movement of its frame; to include an information type component for displaying different types of information based on the size of an information object; and to include an information updating component for updating the displayed information once an information object is resized to a predetermined size associated with a specific type of information.

A yet further feature provides for the inner border moving and resizing component to be configured to move the inner border so that its center lies on the pointer.

A further feature provides for the device to include a clock face component for associating a clock face with the inner border; to include a clock face moving and resizing component for moving and resizing the clock face with the inner border; or to include a clock face fading component for fading the clock face out of view during movement and resizing of the central display region.

Still further features provide for the device to include a current display state component for keeping the display in a current display state when the pointer is removed from the display for at least a predetermined period of time; for the user interface to include a selection component for, responsive to a selection action being performed on an information object, selecting that information object; and for the user interface to include an original state return component configured to return the display region to an original state after a predetermined period of non-interaction therewith or at a predetermined rate after removal of the pointer from the display.

A yet further feature provides for the device to include an input component for receiving input from an input device.

A further feature provides for the device to include an indicator component configured to display an indicator within the inner border, the indicator indicating what point in the information object display area along the outer border and opposite the center of the inner border from the center of the outer border is in the same location as in the original condition of the user interface.

Further features provide for the device to include an information receiving component for receiving updated information relating to an information object; and an updated information object indicating component for indicating what information object has been updated.

Further features provide for the device to include a feedback component for providing feedback to a user in response to an information object being updated; and for the feedback to be either or both of haptic feedback and audible feedback.

Still further features provide for the device to include an animation component for animating an information object to maximize from its position when selected after which it may grow until it covers the entire display or the area enclosed by the border of the display area; and an application launching component for launching an application associated with the information object on an electronic device associated with the user interface; or on another device (such as a parent device) associated with the electronic device of the user interface. The electronic device may be a smartwatch, and the parent device may be a smartphone.

Yet further features provide for the device to include an information object moving component for, responsive to a user performing an information object moving action, allowing the user to move the information object to a desired location along the boundary, and associating the information object with the desired location.

In accordance with a further aspect of the invention there is provided a method for display and interaction in a user interface, the method comprising the steps of:

displaying an information object display area including a plurality of information objects on a track, the track extending along a path created between an outer elliptical border and an inner elliptical border in the user interface, with the inner elliptical border lying within the outer elliptical border;

generating a plurality of elliptical frames along the track, each elliptical frame in contact with the outer elliptical border, the inner elliptical border, a first neighboring elliptical frame adjacent to the elliptical frame and in a first direction along the track, and a second neighboring elliptical frame adjacent to the elliptical frame and in a second direction along the track that is opposite to the first direction;

displaying one or more information objects each based on one of the elliptical frames;

in response to receiving user input associated with movement of a pointer in the user interface:

moving a center of the inner elliptical border in a direction of movement of the pointer while resizing the inner elliptical border so that it remains within the outer elliptical border; and resizing the elliptical frames and moving at least some of the elliptical frames along the track so that all the elliptical frames remain in contact with the inner elliptical border, the outer elliptical border, the first neighboring elliptical frame and the second neighboring elliptical frame.

Embodiments of the invention will now be described, by way of example only, with reference to the accompanying drawings.

DETAILED DESCRIPTION WITH REFERENCE TO THE DRAWINGS

Figure 1:
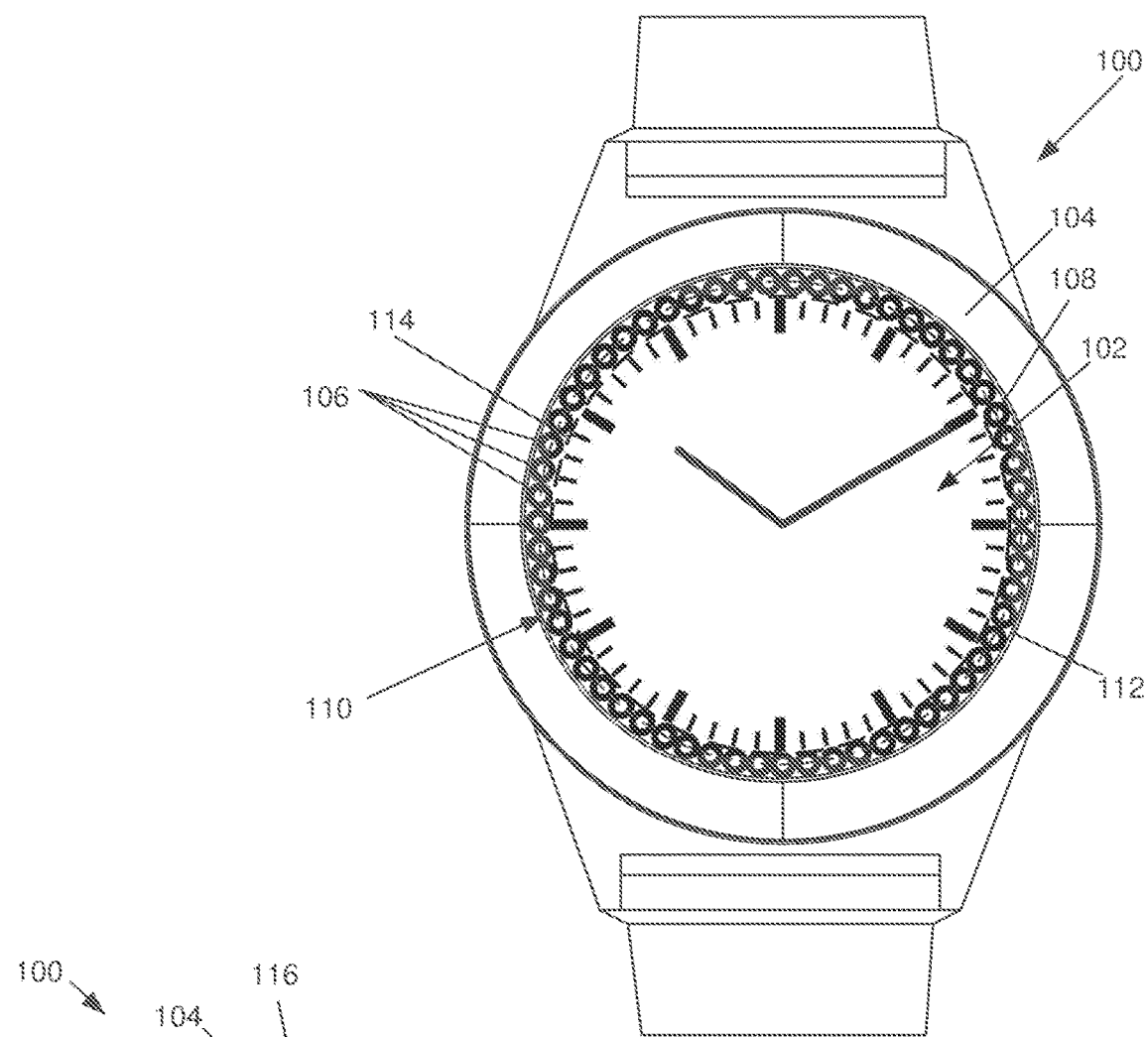
FIG. 1 shows a device with a user interface according to an exemplary embodiment of the invention in an original, resting state.

The present invention provides computer program products, devices and methods which may allow a user to navigate to and/or locate any one of a plurality of information objects in a user interface, to interact with the objects to obtain desired information, or to select any of the objects. Users may often interact with their electronic device to receive updates on certain topics, which may be represented by the information objects. Instead of opening and loading into memory a specific application to reach the desired information, information objects of the present invention may display desired information to a user in a simpler way, which may reduce the time required by a user to interact with the user interface and the electronic device associated therewith in order to locate the desired information. Depending on interaction with the user interface, information objects may grow in size and also reveal more information to a user. This may allow a user to manipulate the user interface, and the information objects, so that they are only provided with the information they desire.

An information object display area is provided for displaying a plurality of information objects to a user. The information objects are displayed on a track which extends along a path created between an outer elliptical border and an inner elliptical border in the user interface. The inner border lies within the outer border. A plurality of elliptical frames are provided along the track, and each frame is in contact with the outer border, the inner border, a first neighboring frame in a first direction along the track, and a second frame in a second, opposite direction along the track.

An information object may be associated with and displayed in each of the frames. User input may be received from a pointer in the user interface. The pointer may be any object that may interact with and control the user interface. This may be when the user interface is provided on a touch-sensitive display and the finger of a user interacts directly with the display on the user interface. The pointer may also be controllable by an external input device such as a mouse. Removal of the pointer from the display may only be possible if the pointer is provided by a finger of a user interacting with a touch-sensitive display. Responsive to the user input, the center of the inner border may move with the pointer. The inner border may also resize to remain within the outer border. At the same time, the frames and the information objects associated therewith may be resized and/or moved so that all of the frames remain in contact with the inner border, outer border, first neighboring frame and second neighboring frame.

The frames may be associated with a specific location on the track in an original, resting condition of the user interface. Then, the information objects may be resized. To keep the condition satisfied that each frame touches the inner and outer borders as well as touch its adjacent frames, a resizing of the frames will also require some of the frames to be moved away from the angular position on the user interface in which they would be positioned in the original, resting condition of the user interface. However, one of the frames may remain stationary in the same angular position on the user interface as in the original, resting condition of the user interface whilst the other frames are so moved and resized. Therefore, the point at which this stationary frame touches the outer border may also remain stationary. A straight virtual line may be drawn on which this point, the center of the outer elliptical border as well as the center of the inner elliptical border lie.

Therefore, it can be said that the frames are resized and/or moved so that a point in the information object display area along the outer elliptical border and opposite the center of the inner border from the center of the outer border is in the same location as in the original condition of the user interface. The point may form an anchor point, with all information objects being arranged and resized around this point. As the pointer is moved on the display, the anchor point may be reconfigured so that a point in the information object display area along the outer elliptical border and opposite the center of the inner border from the center of the outer border is the point that is in the same location as in the original condition of the user interface. All information objects will then be arranged and resized around this point. This may result in the information objects moving and resizing during movement of the pointer so that the information objects appear to move around the track.

Elliptical frames that lie along a straight line between the center of the inner elliptical border and a center of the outer elliptical border are in the same location along the track as in the original condition of the user interface.

As information objects are resized in the information display area, they may reach specific sizes associated with a specific level of information. As an information items grows in size, it may display different levels of information. This may be considered "semantic zooming". If the electronic device housing the user interface has sufficient processing power, it may allow cross-fading between these levels of information. The information may be updated periodically, or continuously, possibly over a network such as the Internet. The information may also be updated from another (e.g. parent) device, such as a smartphone, associated with the electronic device on which the user interface is located, such as a smartwatch. The parent device may, in turn, receive the updated information over a network such as the Internet.

A user may modify a specific location on the track with which an information object is associated when the user interface is in its original, resting condition. By interacting with the user interface, the information objects may be resized to display its information to the user. It is envisaged that a user may remember which information objects are where on the track, which may allow them to quickly navigate to a desired information object. Only minor interaction with the user interface may be required to see adjacently located information objects, which may further aid in navigating to a desired information object to obtain desired information.

The invention may be particularly, but not exclusively, suited to small circular displays and to larger displays on which preview objects are to be displayed. In small displays, the space available to display information is typically limited, and when a user only wants to see limited information the present display and interaction method may enable relatively quick access to many information objects and their associated information.

FIG. 1 shows a device, in this case a smartwatch (100), with a user interface according to an exemplary embodiment of the invention with a touch-sensitive circular display (102). A bezel (104) extends around the display (102). A plurality of frames (106), in this example totaling sixty, are displayed on a track (108) and in an information object display area (110). The track extends along a path created between an outer elliptical border (112) and inner elliptical border (114). The inner border (114), shown by a broken line, lies within the outer border (112). In the present embodiment, the outer border (112) is defined by the border of the display (102), and both the outer and inner borders are circular.

An information object (not visible in FIG. 1) is associated with each frame (106) to be displayed therein. Each frame is in contact with the inner border (114), the outer border (112), a first frame in a first direction adjacent it along the track, and a second frame in a second, opposite direction along the track (108). A center of each of the frames lies on the track (108). The user interface in FIG. 1 is shown in an original, resting condition. Each frame (106) is associated with a specific location on the track (108) in the original condition shown.

In the present embodiment, a clock face is associated with the user interface, and is displayed within the inner border (114).

Figure 2:
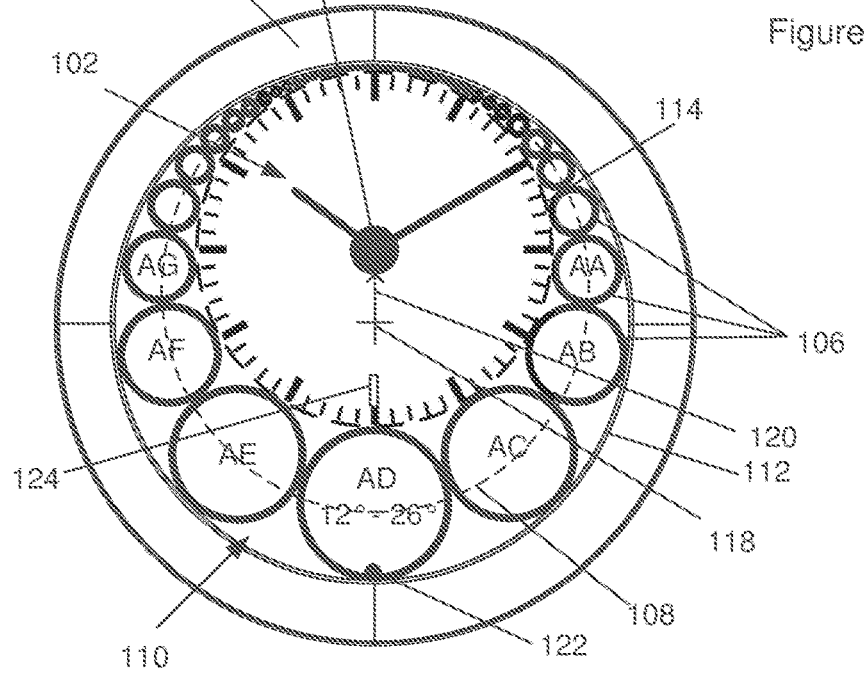
FIG. 2 shows the user interface of FIG. 1 with a pointer placed thereon.

When a user wishes to inspect information associated with an information object, they may interact with the user interface to move the inner border away from the frame associated with the desired information object, as shown in FIG. 2. Items corresponding between FIG. 1 and FIG. 2 are indicated by like reference numerals. For illustrative purposes, the sixty information objects of the present embodiment are tagged alphabetically from A to Z, AA to AZ, and BA to BG, in that order. Object "A" is associated with the location on the track next to the twelve-o-clock position in a clockwise direction, and object "BC" is associated with the location just before the twelve-o-clock position. The thirtieth object, tagged "AD", is associated with the location on the track immediately above the six-o-clock position. The "AD" object, may for example, contain information relating to a present day's weather prediction, and the user may wish to see this information.

The user may place a pointer (116) on the touch-sensitive display of the user interface (102), and move the pointer (116) away from the "AD" object they wish to inspect. In the present embodiment the pointer (116) may be a finger of the user. Movement may be in a direction directly from a center (118) of the outer border to the twelve-o-clock position, as shown by a directional arrow (120). The inner border (114) moves with the pointer (116), so that the pointer (116) remains in the middle of the inner border (114). At the same time, the inner border (114) is resized so that it remains within the outer border (112). The clock face resizes with the inner border (114) so that it remains within it. The outer border (112) remains in the same position and the same size. The path also resizes, as it extends between the outer and inner border. The track (108) is similarly resized. Frames (106) and information objects therein are moved and resized so that they remain in contact with the inner border (114), outer border (112) and neighboring frames in both directions along the track. For the present embodiment, the adjacent neighboring objects of object "AD" are objects "AC" and "AE".

It should be noted that the frames are resized and moved so that a point (122) in the information object display area along the outer border (112) and opposite the center (118) of the inner border, presently below the pointer (116), taken from the center (118) of the outer border (112) is in the same location as in the original condition of the user interface shown in FIG. 1. In other words, elliptical frames that lie along a straight line between the center of the inner elliptical border and a center of the outer elliptical border are in the same location along the track as in the original condition of the user interface. By "same location" is meant the same radial angle along the track, as it will be appreciated that the size of the elliptical frames will not be the same as in their original condition.

An indicator (124) may be provided on a virtual line extending through the center of the inner border (114) and the center of the outer border (112), on the clock face. This may indicate to a user which point is in the same location as in the original, resting condition of the user interface. As a result of the movement of the inner border (114) away from the center (118) of the outer border (112), the indicator (124) will also be adjacent an area which is enlarged the most on the user interface.

In the present example, the pointer (116) is on the center of the inner border (114). As the pointer (116) is directly opposite the six-o-clock position from the center of the outer border (112), the point (122) at the six-o-clock position on the outer border will be in the same location. Similarly, the point on the information object display area along the outer border (112) and opposite the center (118) of the outer border (112) taken from the center of the inner border (114) is in the same location as in the original condition of the user interface shown in FIG. 1. The frames (106) and their information objects between these two points will move and resize as required along the track.

As an information object resizes and grows with its frame, more information associated therewith may be displayed to a user. The tags of the information objects are used as headings for illustrative purposes in the present embodiment, but may be any suitable heading, a logo acting as a heading or an indicator of the information associated with the information object. For object "AD", this may be a "Weather" heading, or a weather icon. This may represent a main heading in the heading hierarchy. Presently, it is only displayed as "AD". It should be noted that relevant information may be displayed instead of only a heading of the relevant information. When an information object is sufficiently resized, its heading may become available as shown in FIG. 2.

In FIG. 2, the headings of object "AD", and three information objects on each side thereof, including objects "AA" to "AG", are visible. The headings could be considered a first type of information associated with an object. Object "AD" has been sufficiently enlarged so that more information than only its heading is displayed thereby. Presently, this information is a minimum and maximum temperature forecast for the day, shown as "12°-26°". This may be considered a second level of information. The three information objects on each side of object "AD" are not large enough to display additional information, and only their headings are visible. If the user wishes to obtain further information about these objects, they will have to ensure that these objects are suitably resized to display this information. This may be achieved by suitable navigation thereto, as later explained below, or by interaction with the user interface to sufficiently enlarge these information objects as well.

It should be noted that in the exemplary embodiment shown, the inner boundary (114) moves slightly closer to the outer boundary (112) whilst resizing, in the same direction as the pointer. The reason for this is elaborated on further below.

The frames (106) all remain in contact with both the inner boundary (114) and the outer boundary (112). All information objects also remain shown on the display. As some of the frames (106) grow in size it is necessary to move the inner boundary (114) closer to the outer boundary (112) to reduce some of the frames (106) in size to allow all of the frames (106) to still be displayed and in contact with the necessary items. As a result, the frames (106) are displayed as part of a Steiner Chain. This is more clearly illustrated in FIG. 3.

A Steiner chain consists of a finite number of circles (in this case, the frames) that are all tangent to two non-intersecting given circles (presently, the inner and outer borders). In addition, every circle in the chain also touches its two neighbors. The radius ratio of an outer and inner circles is constrained by the number of circles in the chain. If this constraint is met, Steiner's porism guarantees that a closed chain can be constructed starting with any circle that touches them both.

Figure 3:
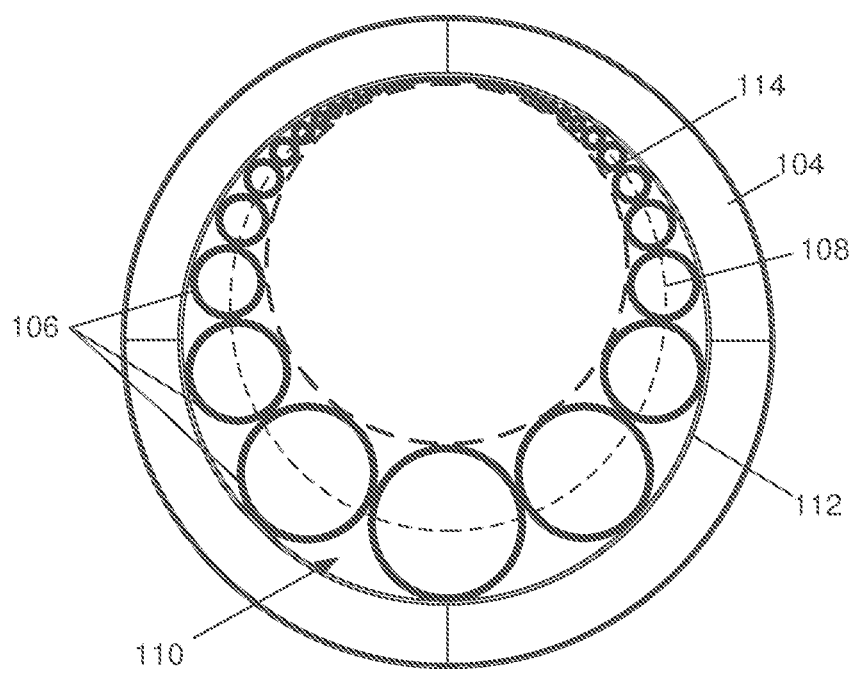
FIG. 3 shows the user interface of FIG. 2 with information objects removed to illustrate a Steiner Chain format thereof.

FIG. 3 shows the user interface of FIG. 2 with some of the content removed to illustrate the Steiner Chain format thereof. Like features are indicated by like reference numerals. Each frame (106) is located on the elliptical track (108) and with its center lying thereon. Each frame is in an elliptical shape, presently in the form of a circle. The track lies between the inner border (114) and the outer border (112). Each frame (106) touches the inner border (114), the outer border (112) and a neighboring frame adjacent and to each side of it along the track. The frames of the present embodiment are always resized and moved so that they are displayed in a Steiner Chain shape.

Figure 4:
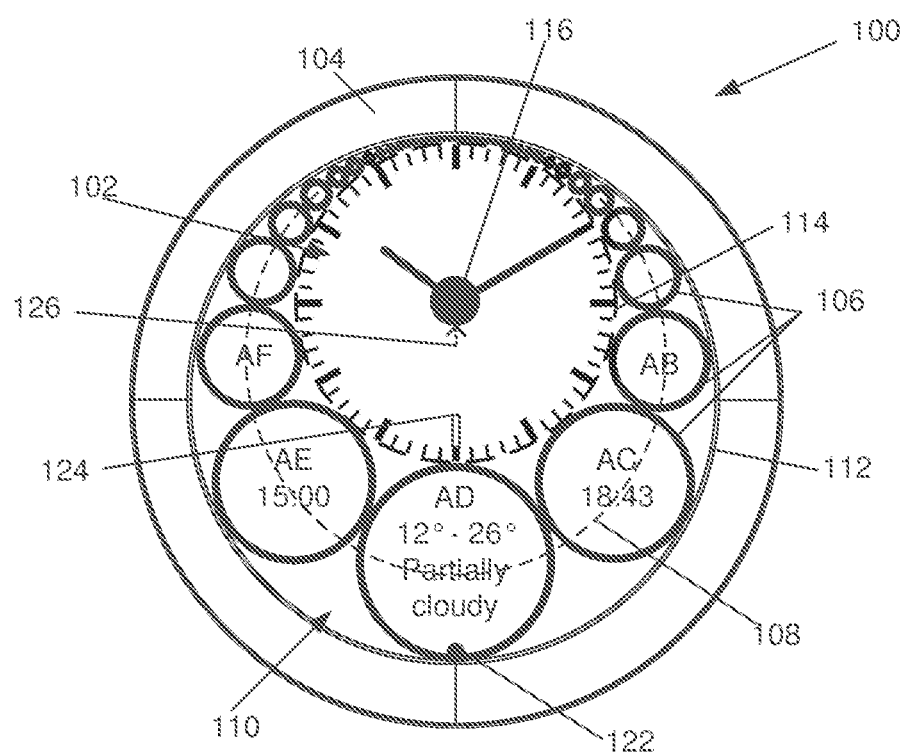
FIG. 4 shows the user interface of FIG. 2 after a first movement of the pointer.

FIG. 4 shows further movement of the pointer (116) occurring on the user interface of FIG. 2. Like features are indicated by like reference numerals. The pointer (116) is moved closer to the twelve-o-clock position of the outer border (112), as indicated by a directional arrow (126). Information object "AD" and its frame further grows in size, and so does the information objects adjacent it. Again, all the frames (106) and information objects associated therewith move and resize so that they remain displayed in the format of a Steiner Chain, with the inner border (114) reducing in size and moving. In FIG. 4, object "AD" has grown sufficiently so that even more additional information is displayed therein. It now includes the wording "Partially cloudy" in addition to the predicted temperature and heading. This further expands on the predicted weather for the day, and may be considered a third level of information associated with object "AD". At the same time, the frames and information objects immediately adjacent object "AD", objects "AE" and "AC", have increased in size to be large enough so that a second level of information may also be displayed therein. In the present embodiment, object "AE" includes a time of the user's next meeting, shown as "15:00", and object "AC" includes the time of the present day's sunset, presently shown as "18:43". Objects "AB" and "AF" are still of a size that only allows their headings to be displayed. However, objects "AA" and "AG" have now reduced in size to retain the Steiner Chain format of the display, but are too small for their headings to be displayed. It should be noted that objects "AA" and "AG" are now located higher up on the display due to their movement, giving the appearance of them "flowing" along the track (108). The inner border (114) has also moved closer to the outer border (112) in the direction of movement of the pointer (116). The indicator (124) remains in the same orientation within the inner border.

Figure 5:
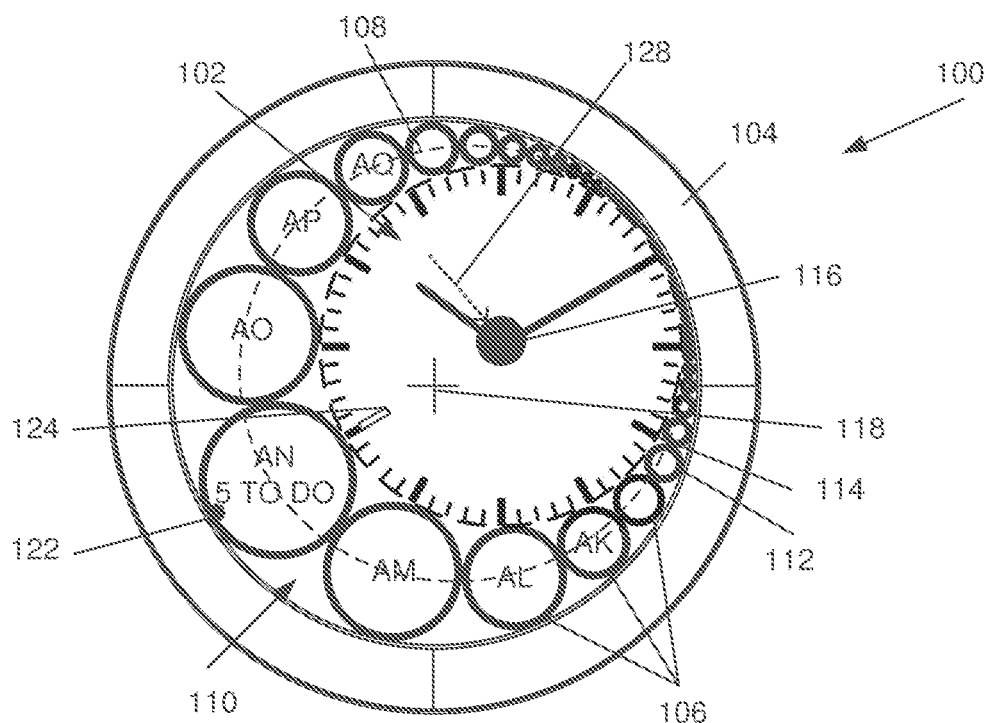
FIG. 5 shows the user interface of FIG. 4 after a second movement of the pointer.

FIG. 5 shows the user interface of FIG. 4 after additional movement of the pointer (116) has occurred. Like items are indicated by like reference numerals. The user wishes to obtain information about an information object associated with an eight-o-clock position on the track (108), presently an object tagged as "AN" and which relates to a to-do list of a user. The user moves the pointer (116) to a position directly opposite the eight-o-clock position as shown by the directional arrow (128). The inner border (114) follows the pointer (116), with its center lying thereon. As a result, the inner border (114) resizes and moves with the pointer (116), and the frames (106) and information objects are resized and moved so that a point (122) directly opposite the pointer (116) from the center (118) of the outer border (112) is located at the same position than in the original, resting condition of the user interface as shown in FIG. 1. The frames (106) and their information objects move along the track (108) to allow this point (122) to be in the same location. The indicator (124) moves to the eight-o-clock position within the inner border (114). The Steiner Chain display format is retained by the movement and resizing of the inner border (114) and frames (106). The information object of interest, object "AN", is now large enough to display more than its heading, presently a second level of information reading "5 TO DO". This indicates to a user that they have 5 items on their to-do list. Again, three information objects to each side of object "AN" are large enough so that their headings are displayed.

Figure 6:
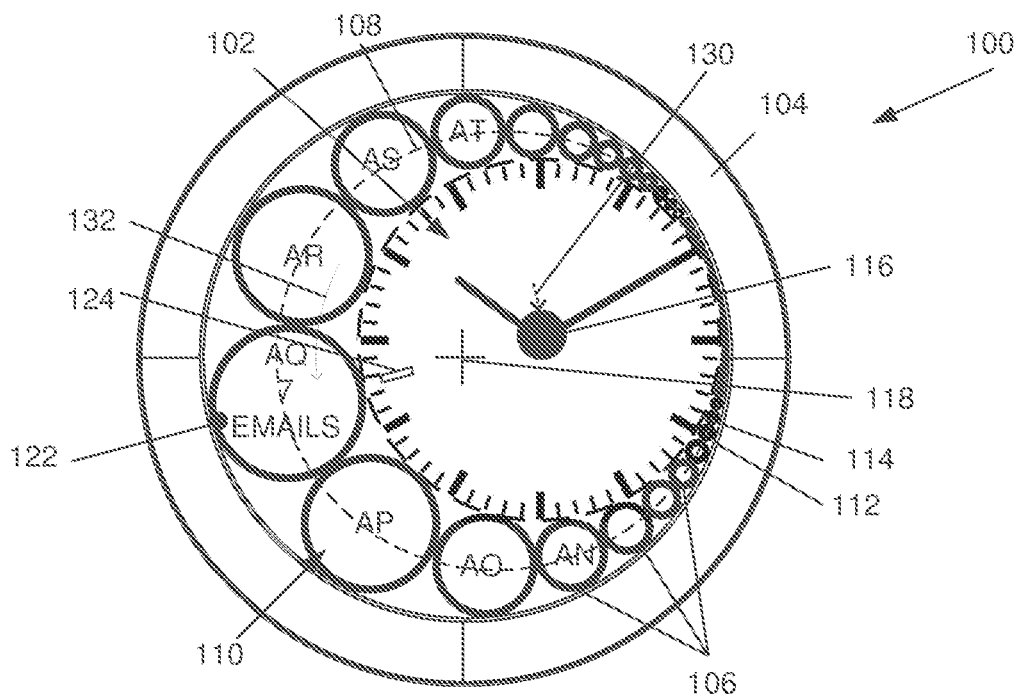
FIG. 6 shows the user interface of FIG. 5 after a third movement of the pointer.

A user may notice object "AQ", which heading indicates that it relates to the user's emails. The user may navigate to see more information about object "AQ" by moving the pointer (116) in a clockwise arc, indicated by a further directional arrow (130) in FIG. 6. In the present embodiment, the pointer (116) remains a fixed distance from the center (118) of the outer border. In turn, the inner border (114) moves, with the frames (106) and their information objects resizing and moving to still provide the Steiner Chain display format. The indicator (124) moves to between the eight- and nine-o-clock positions within the inner border, where object "AQ" is associated with in the original condition of the user interface. To navigate to an information object, the pointer must be located directly opposite a point (122) on the outer border (112) from the center (118) of the outer border (112), the point at that information object in the original condition of FIG. 1. As a result, to navigate to an information object located in a clockwise orientation to information object "AN", the pointer (116) should also be moved in a clockwise direction. As the pointer (116) moves in a clockwise direction, the information objects appear to flow in the information object display area (110) in an anti-clockwise direction as shown by a still further directional arrow (132), with the result that an information object associated with a location a clockwise direction from object "AN" is enlarged and brought into view. Movement in an opposite direction will result in navigation in the opposite direction. In FIG. 6, the pointer (116) has been moved sufficiently so that object "AQ" appears to have flowed on the track (108) and so that additional information is displayed object it. The additional information displayed with object "AQ" presently shows "7 EMAILS", indicating that the user has seven unread emails.

Movement of the pointer (116) further away from object "AQ" may display additional information about these emails, for example whether or not any of these emails are marked as "urgent". However, the user may wish to obtain even more information about these seven emails. The user may then perform a selection action on object "AQ".

Information objects may define a hierarchy of headings. By selecting an information object displaying a main or top-level hierarchy heading the user interface may replace the relevant heading with a sub-heading, lower in the hierarchy. A "return" function may allow the user interface to revert back up the hierarchy of headings.

Figure 7:
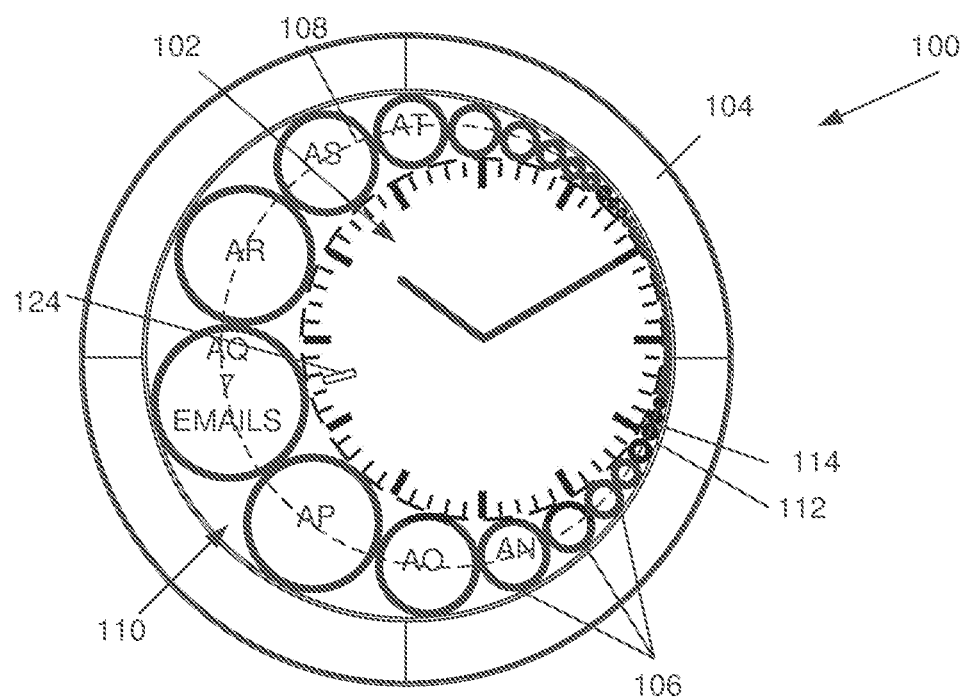
FIG. 7 shows the user interface of FIG. 6 with the pointer removed therefrom.

In FIG. 7, the pointer has been removed from the user interface as it was shown in FIG. 6, presently by the user removing their finger from the touch-sensitive display. Like items are indicated by like reference numerals. The display state of the user interface remains the same when the pointer is lifted therefrom. Then, a user may perform a selection action on a desired information object. In the present embodiment this is performed by placement of the pointer on the information object of interest and the subsequent removal of the pointer therefrom. In the present embodiment, this is shown as object "AQ" which may represent a main or top-level heading in the heading hierarchy. The pointer (114) is shown placed on object "AQ" in FIG. 8.

Figure 8:
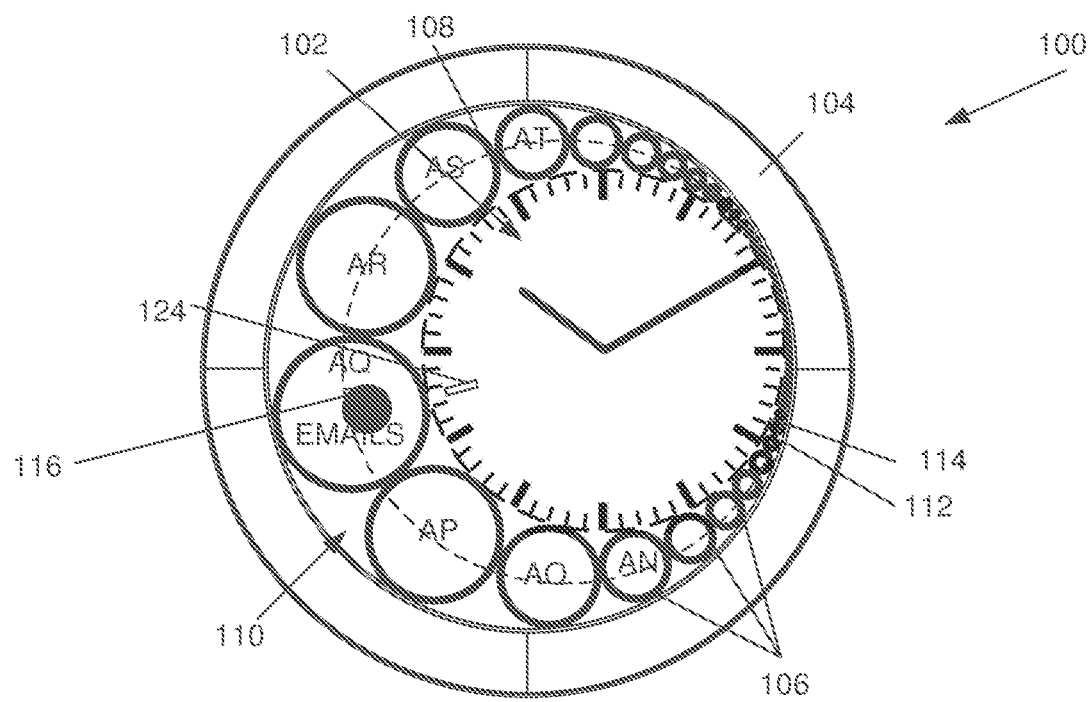
FIG. 8 shows the user interface of FIG. 7 with a selection action being performed on an information object.
Figure 9:
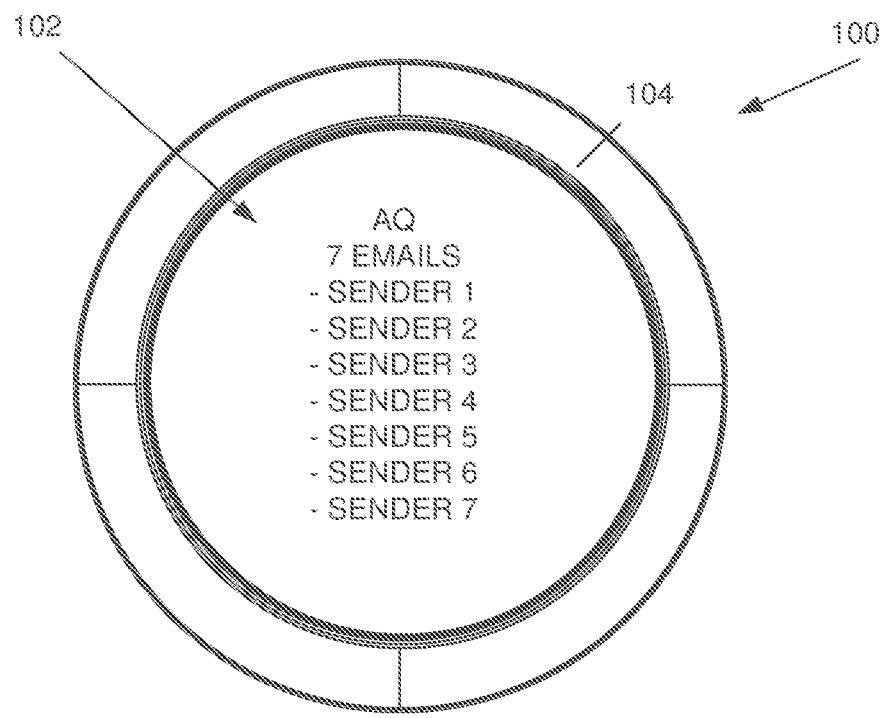
FIG. 9 shows the user interface of FIG. 8 after the selection action has been performed.

By then removing the pointer from object "AQ", the selection action performed thereon will be complete. The selection action may be considered a "tap" on the information object as is known in the art. FIG. 9 shows the user interface after the selection action on object "AQ" as illustrated in FIG. 8. Like items are again indicated by like reference numerals. Object AQ grows to cover the entire display region, and shows further information about the information object. The heading and number of emails are still displayed, but now the senders of the seven new emails are also displayed. While the small, circular display region may not be suitable for further reading of the seven unread emails, the user may then use their smartphone to further inspect these emails if so desired. The information object may be animated to grow from its previous position until it covers the entire display region. A back function may be provided, for example another tap, or even a type of swipe, to return to a previous display similar to that of FIG. 7. The information object may also be animated to animate back to its previous location on the track.

It should be noted that, instead of enlarging object "AQ" to cover the display region, selection thereof may also cause the main heading of the relevant information object to be replaced with a sub-heading in the above-mentioned heading hierarchy. Alternatively, selection of the object may cause the launching of an application on a related electronic device, for example a parent smartphone associated with the smartwatch. In the present example, an email application may be launched on the smartphone in which the specific unread emails may be viewed, responded to, or otherwise interacted with as is known. It will be apparent that for different types of information objects, different results may be desired based on a selection action performed thereon. A specific application may also be configured to launch on the smartwatch itself in response to its selection. This may be any application suitable for use on the smartwatch. An application launching function may also be performable when the information object covers the entire display as in FIG. 9.

The user interface may allow a user to move information objects on the track by associating an information object with a position on the track as desired. As an example, FIGS. 10 to 13 show how a user may move object "AQ" from its position shown in FIG. 7, where it is associated with a location between the eight-o-clock and nine-o-clock position on the track, to two positions before the 12-o-clock position, where object BF is currently located. Like features are indicated by like reference numerals.

Figure 10:
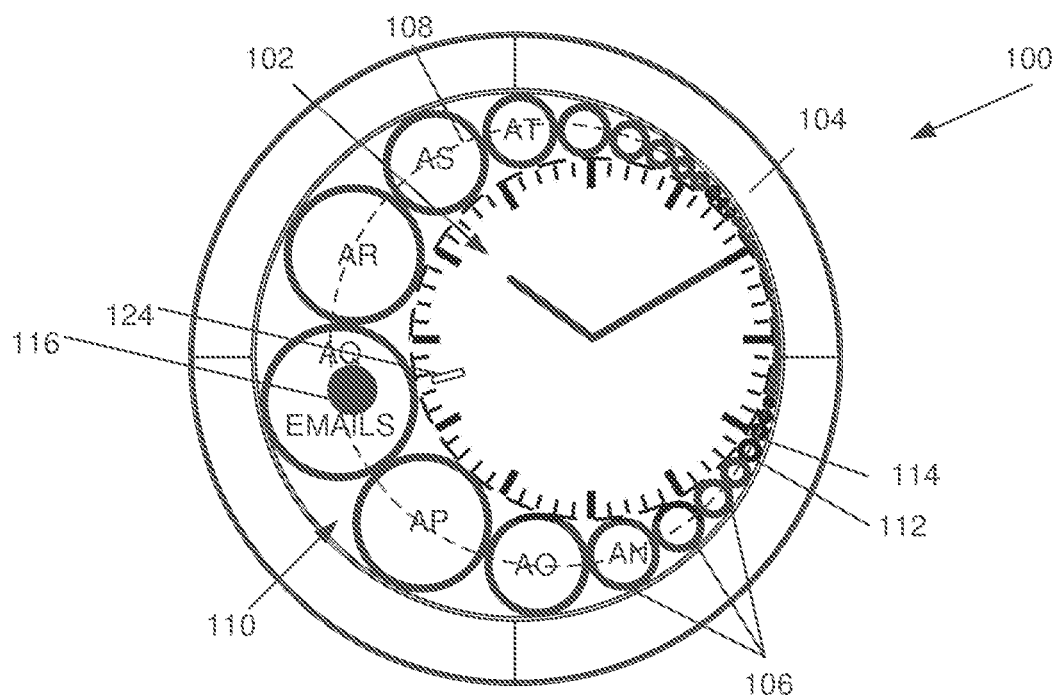
FIG. 10 shows the user interface of FIG. 7 with a movement action being initiated performed on an information object.
Figure 11:
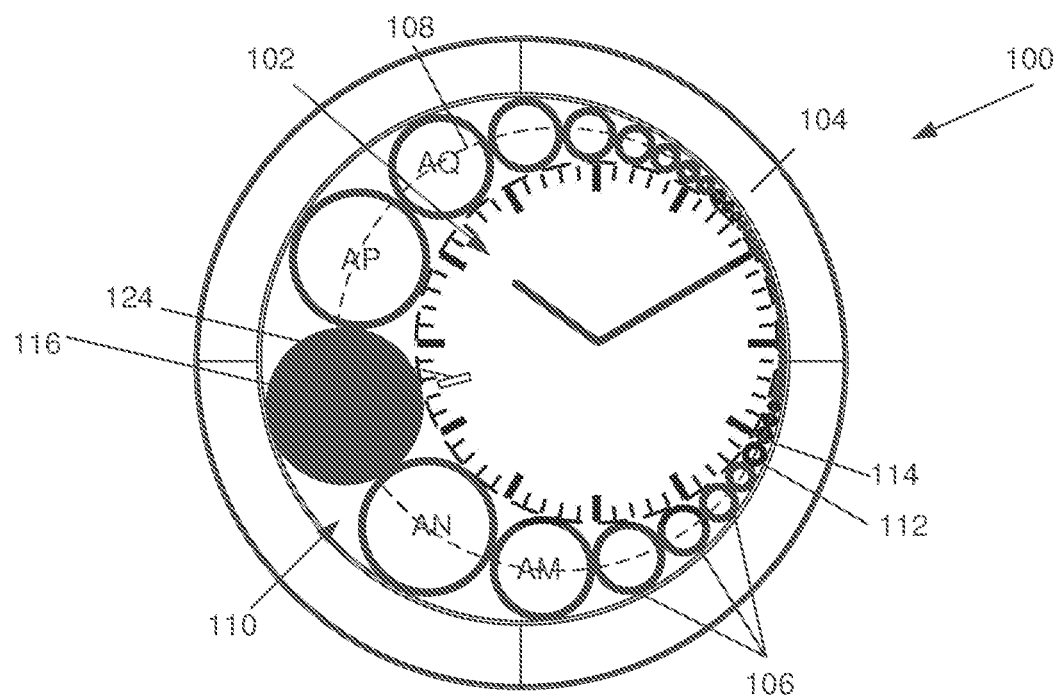
FIG. 11 shows the user interface of FIG. 10 after the movement action has been initiated.
Figure 12:
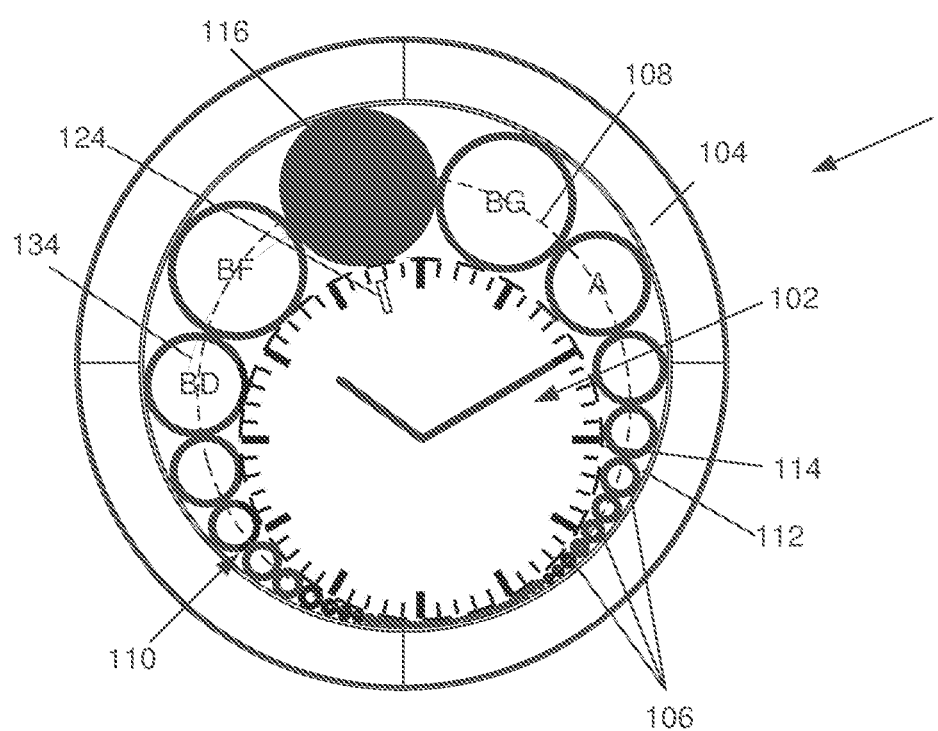
FIG. 12 shows the user interface of FIG. 10 during movement of the information object.
Figure 13:
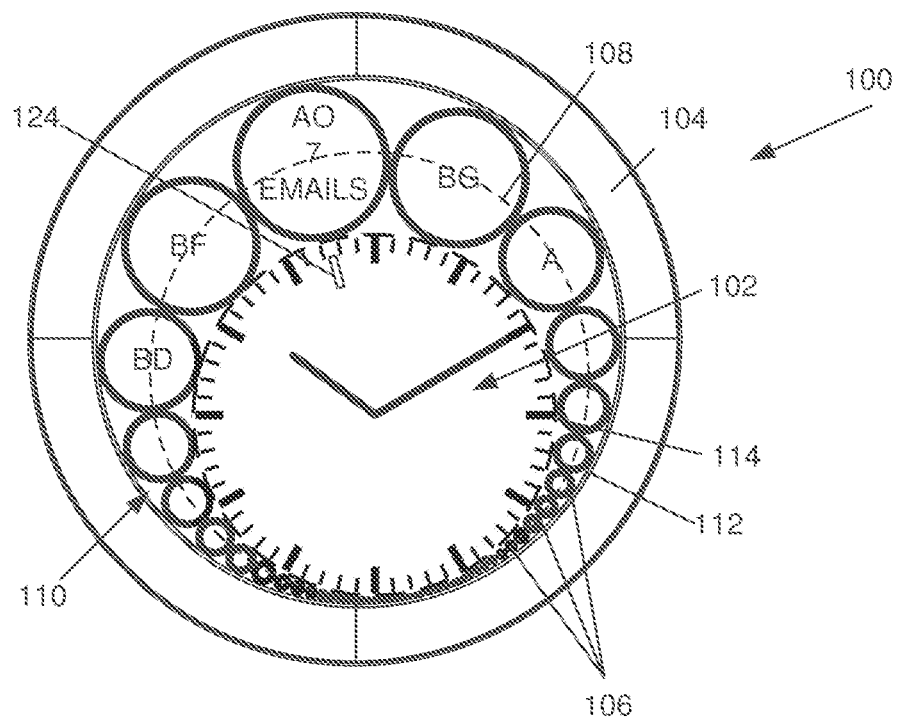
FIG. 13 shows the user interface of FIG. 12 after movement of the information object is complete.

In FIG. 10, a user places the pointer (116) on object "AQ", and holds it thereon. After a predetermined period of no movement of the pointer, a movement action of object "AQ" is initiated and it becomes blacked out. This is shown in FIG. 11. Then, the user may move the pointer (116) on the display region to drag object "AQ". The blackened object "AQ" follows the pointer, and the inner border (114) resizes and moves to allow a user to see the position where the object is being moved to. As the blackened object is moved in the information object display region, the other frames and their information objects are re-ordered, moved and resized therearound. The user may move the pointer, and therefore the blackened information object "AQ", in the manner shown in FIG. 12 along the indicated directional arrow (134) until it reaches a desired location in the information object display region. It should be noted that the inner border is moved and resized along with the movement of object "AQ" so that release of object "AQ" will associate it with that position on the track. Removing the pointer (116) from the display then completes the moving action. This is shown in FIG. 13, where object "AQ" is now located between object "BF" and object "BC". Objects "AR" to "BF" have now all shifted from their previously associated locations to allow the new location of object "AO". In this manner, a user may customize the specific location of the information objects on the track in the original condition of the user interface.

It is envisaged that a user may remember at least an approximate location of an information object of interest to them, and interact with the user interface in a more-and-more familiar manner as they get used thereto. As there may be a large number of information objects and frames on the user interface, a user may not always reach a desired object immediately. However, relatively small interactions with the user interface may allow the user to navigate to the desired object if they have started their navigation in a region near the desired object and information.

The present user interface may allow a user to reach certain information more easily and quicker than by launching specific applications required to access that information. There is also no need to browse through separate pages of icons relating to applications, or through separate pages of widgets, which may contain the desired information of interest to a user. With relative ease, a user may navigate to desired information, peek at it when the relevant information object has been sized to provide the desired information, and then simply stop interacting with the user interface once the information has been reached. The user interface may be configured to return to its original, resting state after a predetermined period of inactivity and no interaction therewith, possibly 10 seconds or the like. Alternatively, the user interface may gradually return, with the frames and inner border gradually resizing and/or moving to return to their original locations on the user interface.

The type of information provided by information objects may be selected so that the present invention provides a user with timeous brief updates on items of individual interest. A user may "peek" or "glimpse" at information objects by suitable navigation thereto as described above. It is envisaged that publishers may create and push content to a user's electronic device, which may be displayed as an information object. This may allow for advertisement or the like to be incorporated with the present invention. As a user cycles through adjacent information items, the user may be provided with advertisement content as part of an information object. Such advertisement content may be noted by a user for a small enough time that it does not bother them, but may still be noticed by the user. The advertisement content may be provided in an information object adjacent an information object of interest, and navigating in the user interface so that a desired information object is displayed may result in the advertisement content in the adjacent information object being displayed. A user may subscribe to specific content, which may provide access to certain information objects that may be activated on a user interface of the user's electronic device.

While the above embodiment only mentions sixty information objects that are displayed on the user interface, it is envisaged that up to 120, or even more, information objects may be provided with suitable visibility. FIG. 1 shows that the embodiment above, in the original state of the user interface, displays the information objects in very small frames forming a chain about the outer periphery of the display. However, the information object display area (and the information objects therein) may be hidden in the original state of the display and may only appear in response to the movement of the pointer on the display.

Any type of information may be displayed in information object item, and not necessarily in different levels of information. Only a single level may be provided. Examples of information that may be provided and which may be expected to be continuously updated, while a user may only need to "peek" at the information to note its contents, include a date, a time in a different time zone, an elapsed time since a specific occurrence or a remaining time until a specific occurrence, a moon phase, a social media feed of a specific person, a score of a sports game, a time of day, a weather forecast, an exchange rate, share and commodity prices, flight progress and/or status, personal health indicators such as a number of steps taken, flights of stairs climbed, calories burned or the like in a specific time period, new headlines, and the like. It is envisaged that the type of information may need to be simple and highly structured, but limited, to prevent unnecessary information being provided to a user which may take up unnecessary time. These examples may be required on demand by a user, but need not be delivered to a user so that they interrupt the user unless they represent a specific emergency, for example a cancelled flight, or a predefined time-limited opportunity, for example that a share or commodity price is above a predetermined level.

The above description only describes the display to be a circular display, such as that of a smartwatch. However, a specific display area may be provided on any other display device, for example a rectangular screen, and the present display and interaction method may be equally well used on such a display. Examples of devices with rectangular screens include mobile phones, tablets, phablets, televisions, or the like. An elliptical or circular area may be demarcated on such rectangular screen, where the present display and interaction method may be implemented.

It is envisaged that a user interface with information objects according to the present invention may be specifically adapted for a specific group of people, for example a specific industry or profession. In a hospital setup, for example, the information objects may provide information regarding specific patients to a doctor or nurse, such as their vital signs. To an information technology specialist, server load, disk space usage, network activity or the like may be particularly useful to inspect with minimal effort. Details of a manager's staff, for example who or how many people are on leave, who has already clocked in or who has not yet arrived, or the like may be provided.

By allowing a user to access information of interest via peeking thereat in accordance with the present user interface, launching a specific application to reach that information may not be required.

It should be noted that the present invention may be usable with any type of user interface provided by any suitable electronic device. It need not only be used with a smartwatch as per the above examples. The user interface may be provided by a smartphone, a tablet, a laptop computer, a desktop computer, or the like.

It is further envisaged that information objects may not be displayed in an original, resting condition of the user interface and display. The information objects may only be displayed upon interaction of the pointer with the display. Then, a clock face associated with the inner border may in the original, resting condition extend across the entire display.

In the above embodiment, the center of the inner border follows the pointer, and as a result the pointer drags the inner border along its center. However, it is envisaged that the pointer may drag the inner border from any location thereof. Additionally, the inner border may be configured to automatically jump so that its center is on the pointer for example when the pointer is merely placed on the user interface. The inner border may immediately be resized, and the frames and their associated information objects may also be immediately resized and moved. Then, further movement of the pointer may cause updating of the user interface as explained above.

As the inner border tracks the movement of the pointer in the display, the pointer will not occlude and block information displayed in relation to an information object of interest. This may be particularly beneficial when the pointer is a finger of a user, which may otherwise have prevented a user form seeing a significant portion of the display, particularly when the display is a touch-sensitive display of a smartwatch as per the present embodiment.

Figure 14:
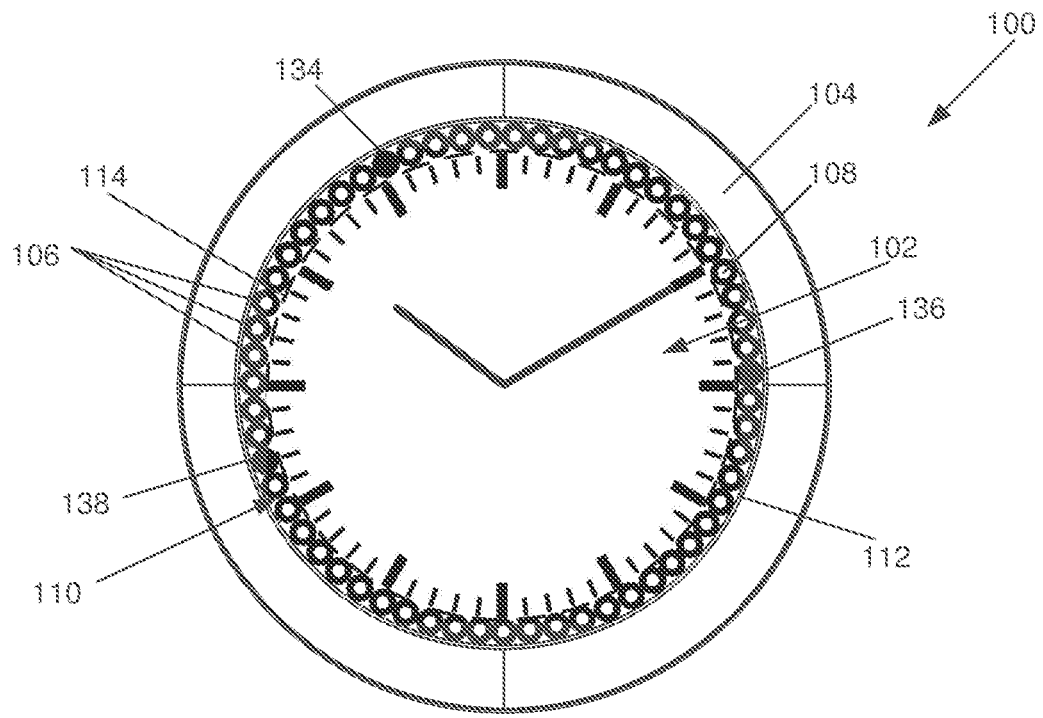
FIG. 14 shows the user interface of FIG. 1 with indicators as to which information objects has been updated.

Information associated with information objects may be automatically updated over a network connection, such as the Internet, at predetermined intervals or continuously. A cloud or web-based platform may aggregate information from various sources, and periodically deliver it to the electronic for display as part of an information item. FIG. 14 shows a manner in which a user may be notified of information objects which has been updated. When information associated with an information object has been updated, a user may be informed as to the identity of an updated object by a specific appearance being applied to the information object in the original state of the user interface. In FIG. 14, three frames (134, 136, 138) having updated information objects associated therewith and shown in the original state of FIG. 1 have been updated, and have been colored, presently blacked out. This indicates to a user that they are updated and may be inspected to uncover new information. However, the information objects may also be configured to flash or in any suitable way identify themselves. The user may then interact with the user interface as explained above in order to enlarge the updated information objects and reveal the updated information without significant browsing or launching of applications. It is envisaged that the user may be informed via haptic feedback, such as via vibration applied with the smartwatch, that an information object has been updated. An audible feedback may also be provided by means of a speaker of the smartwatch, either exclusively or in combination with haptic feedback. A user may be allowed to set which of their information objects may disturb them, either via a displayed notification, an alarm, or via haptic feedback, responsive to them being updated. This may limit distraction, particularly if a significant number of information objects, such as the envisaged 120 objects, may be provided.

It should further be appreciated that the track, outer border, inner border and frames may be hidden from view on the user interface while the information objects are displayed. Furthermore, the frames need not even be calculated or drawn. By applying the Steiner porism, the positions or center points of the Steiner chain circles (that would touch if drawn) may be determined based on the outer and inner borders. This would therefore also determine a designated area for the placement of the elliptical information objects. Without drawing the Steiner chain circles as frames, the elliptical information objects may merely be displayed at these determined positions without drawing a frame around them. However, this will nevertheless create invisible or virtual borders surrounding each information object. Therefore, referring to a "frame" for the containment of the information objects should be broadly interpreted as also meaning a designated area for the placement of an information object that, were a visible border to be provided thereon, would form a Steiner chain and touch adjacent frames and the outer and inner borders as described above.

The borders surrounding the elliptical frames need not be a solid, visible border and may instead be a transparent border. In some embodiments, the track, outer border, inner border and frames may be hidden from view on the user interface while only information objects are displayed. In other embodiments, the information objects may be surrounded by smaller visible frames within the invisible frames, where only the invisible frames touch each other and touch the inner and outer borders.

Figure 15:
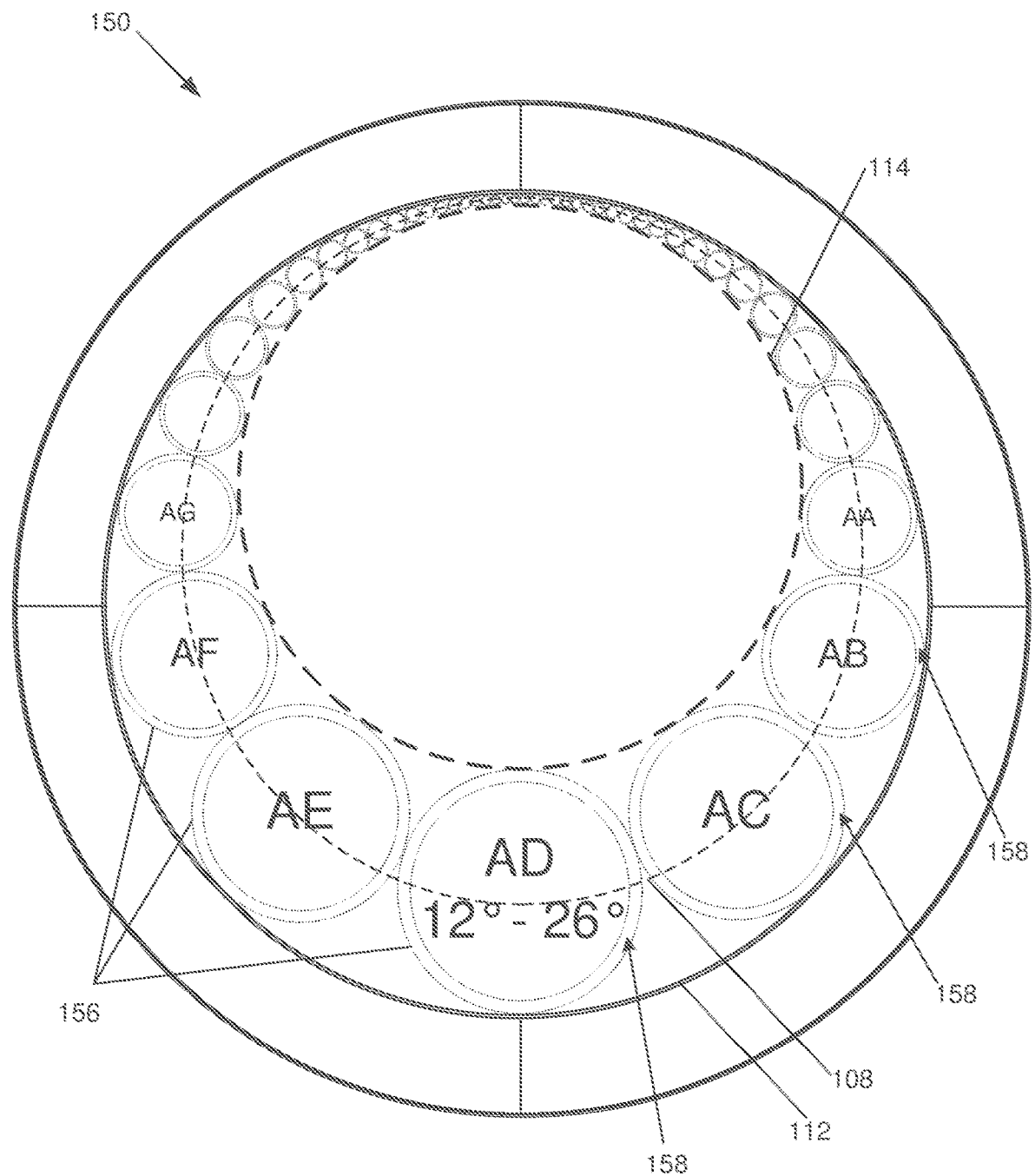
FIG. 15 shows the user interface of FIG. 2 in which the borders of the frames are transparent.

FIG. 15 shows a further embodiment of a user interface (150) that is similar to the user interface of FIG. 2 with like features indicated by like reference numerals. Each frame (156) is similarly located on the elliptical track (108) with its center lying thereon. Each frame has a transparent border (158), indicated with broken lines, which has the visual effect that the frames do not touch adjacent frames. While the borders (158) are shown to be totally transparent in the present embodiment of the user interface (150), the degree of opacity of the borders may vary. The degree of opacity of each frame (158) may even have a gradient so that the border has the visual effect of fading towards its outer edges. Furthermore, the thickness of the borders (158) need not be uniform. For example, the border (158) may be thinner where the frames (156) touch the outer border (112). In other embodiments, the borders may have a zero thickness, such that the content displayed in the frame extends all the way to the outer periphery of the frame. This may create the visual appearance of the frames being seamless.

While the above embodiment describes three levels of information which may be associated with an information object, there may only be a single level of information, two levels, or potentially more levels. Each sublevel may be displayed recursively in the manner depicted in FIGS. 1 to 15, i.e. with the items contained in the sub-level represented in the elliptical frames arranged along the track, allowing the user to navigate the hierarchical, nested levels. The change in an information object as described with reference to FIG. 14 may also be considered a level, the level merely indicating an updated status thereof. A second level may be an identifier of the information object, while a third level may be specific information which may be of interest to a user. Interaction with the information object may stop at this stage. Alternatively, the user may navigate to cycle between several information object and to obtain this second level of information in relation to multiple information objects. A fourth and final level may require specific selection of an item, as described above and where the information object may be selected to cover an entire display of an electronic device, launch an application thereof either on the electronic device itself or a parent device thereof, or the like.

When selecting a particular information object, thereby either launching an application or entering a sub-level, the particular selection may be displayed to the user in an animated manner. This animation may firstly maximize the display with the selection, shortly after which it shrinks somewhat to allocate space about the outer periphery of the display for the frames that are to display the relevant level's items. The degree by which this shrinkage occurs may be linked to the number of items contained in the particular selected level.

An information object may have specific properties including, but not limited to, an identity and a display identifier, a publisher or owner, a static background image, an expected frequency of change, a time of last update, a state, for example changed, requires attention, or urgent, and an updated value or content, representing information associated therewith.

Information associated with information objects may be private or public, open or confidential, premium or free, curated or found, slow or fast changing, measured or predicted, and quantitative or textual.

Security and encryption measures may be important to support verified and trusted transfer of sensitive information. Identities of both publishers of information and of receivers thereof may need to be verified in certain circumstances. Abuse of the platform publishing information to user's electronic devices may occur, and specific methods may need to be provided to counteract such abuse.

Information objects may only be updated at specific times or in specific intervals, as continuously pushing information to a user's electronic device may unwantedly deplete its battery. This may be a particular problem if the electronic device has limited battery capacity, for example in a smartwatch. Data usage may also be a concern and limited package transfers may limit overuse of data to a user.

It is envisaged that information objects may be configured to only update when a user attempts to see the information associated therewith. This may further limit unnecessary data transfer and battery usage, and may be desired when an information object may be expected to update regularly, such as an exchange rate or commodity price.

One example of an application that may be selected by user input and launched and displayed on the user interface is a "wrist dialer" on a smartwatch. The wrist dialer may allow a smartphone associated with the smartphone to dial a selected number quickly and conveniently on the smartwatch. Recursively displaying sub-levels of items as explained earlier may be required for a large set of contacts. For example, the contacts may be sorted alphabetically and an upper level of the wrist dialer may have frames that each displays a different letter of the alphabet. Selecting a particular letter, say "B", will enter a sub-level with the contacts whose surname starts with the letter "B" displayed on each of the frames. Alternatively, an upper level may provide for "recent contacts", or "favorite contacts" with the sub-level thereof having the relevant contacts displayed on the frames.

Another example of such an application that launches on the user interface is an application that represents the periodic table of elements. Elements may be grouped together on upper levels by, say, metals and non-metals. A sublevel, using the example of non-metals, may then have elements grouped under halogens, noble gasses, etc. A further sub-level, using the example of halogens may then display the relevant elements (fluorine, chlorine, bromine, iodine and astatine) on the frames provided on the display. An even further sub-level, using the example of chlorine, may then display the element's properties, such as atomic mass, atomic number, etc.

Furthermore, while the invention has largely been described herein using a round display of a smartwatch as an exemplary embodiment, the user interface may be implemented on rectangular displays also. An ellipse may be placed anywhere on the rectangular display which may form the outer elliptical border of the user interface with the rest of the elements of the user interface described above implemented in this outer border. The user interface may be used as a display within a display. For example, a map may be viewed on a rectangular screen with a small circle unobtrusively located near a point of interest. Selecting the circle may open up a user interface as described above to provide information about the relevant point of interest. An upper level may, for example, display "attractions", "accommodation", etc. on the frames of the user interface, with a listing of each provided in sub-level. A line may be drawn from the point of interest to the outer elliptical border of the user interface to indicate to which area on the map the content displayed in the user interface relates.

Figure 16:
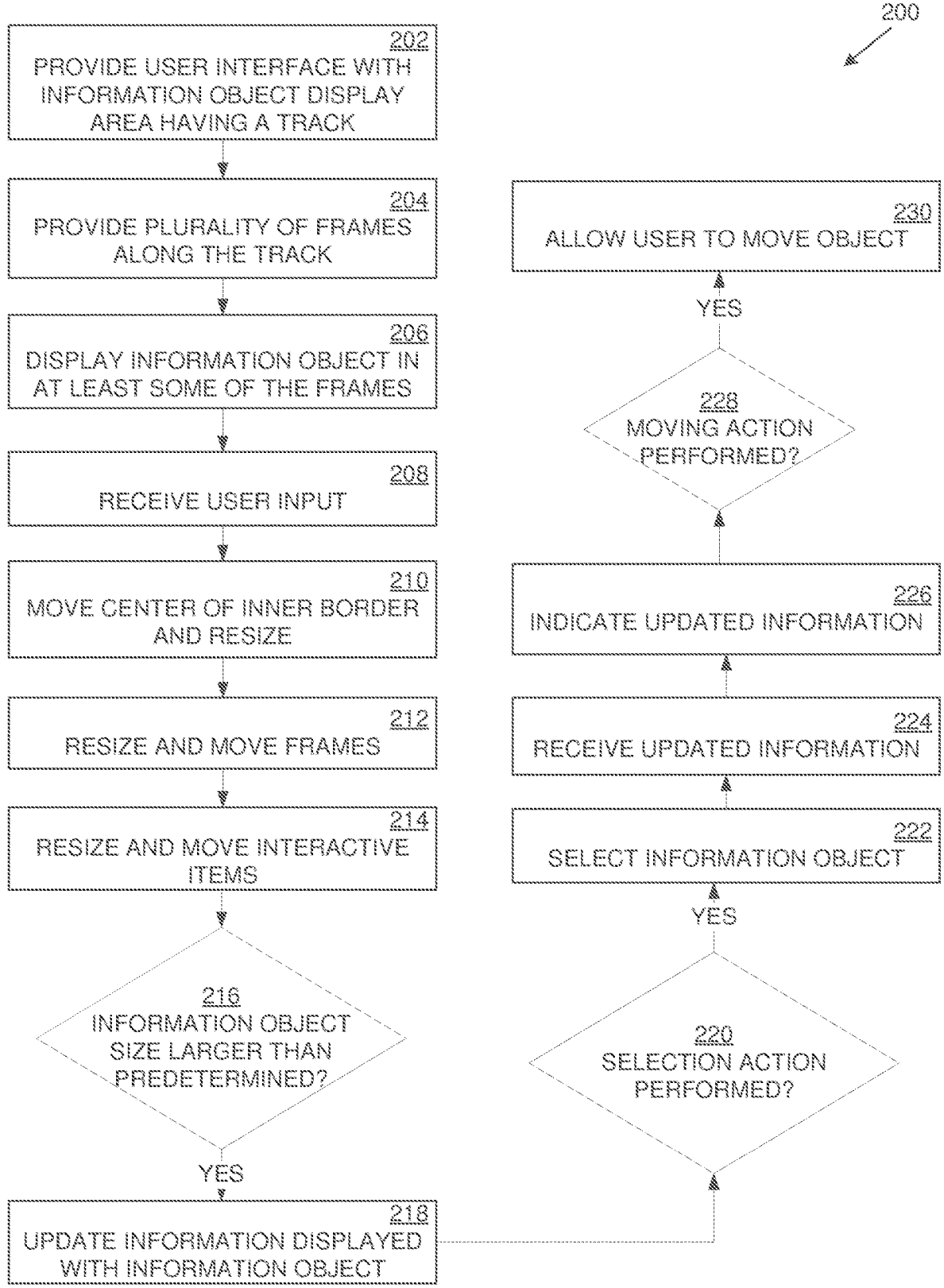
FIG. 16 is a flow diagram illustrating steps performed in a display and interaction method in a user interface in an exemplary embodiment of the invention.

FIG. 16 shows a flow diagram (200) illustrating steps performed in an exemplary display and interaction method in a user interface in an exemplary embodiment of the invention.

A user interface is provided (202) with an information object display area having a track extending along a path created between an outer elliptical border and an inner elliptical border in the user interface, with the inner border lying within the outer border. A plurality of elliptical frames are provided (204) along and displayed on the track. Each of the frames are in contact with the outer border, the inner border, a first neighboring frame adjacent it and in a first direction along the track, and a second neighboring frame adjacent it and in an opposite, second direction along the track.

One or more information objects are displayed (206) in and based on at least some of the frames. When user input is received which relates to movement of a pointer in the user interface, the center of the inner border is moved (210) in the direction of movement of the pointer, and the inner border is also resized so that it remains within the outer border. The frames are resized and moved (212) along the track so that all the frames remain in contact with the inner border, outer border, first neighboring frame and second neighboring frame. The information objects associated with the frames are also resized (214) and moved with the frames.

When an information object is determined (216) to be larger than a predetermined size, information displayed therewith is updated (218). When a selection action is performed (220) on an information object, that information object is selected (222).

Updated information may be received (224) in relation to an information object, and details of which information object is updated may be indicated (226) to a user.

When a moving action is performed (228) on an information object, a user may be allowed (230) to move the information object to a specific location on the track where they would like the information object to be associated with.

Figure 17:
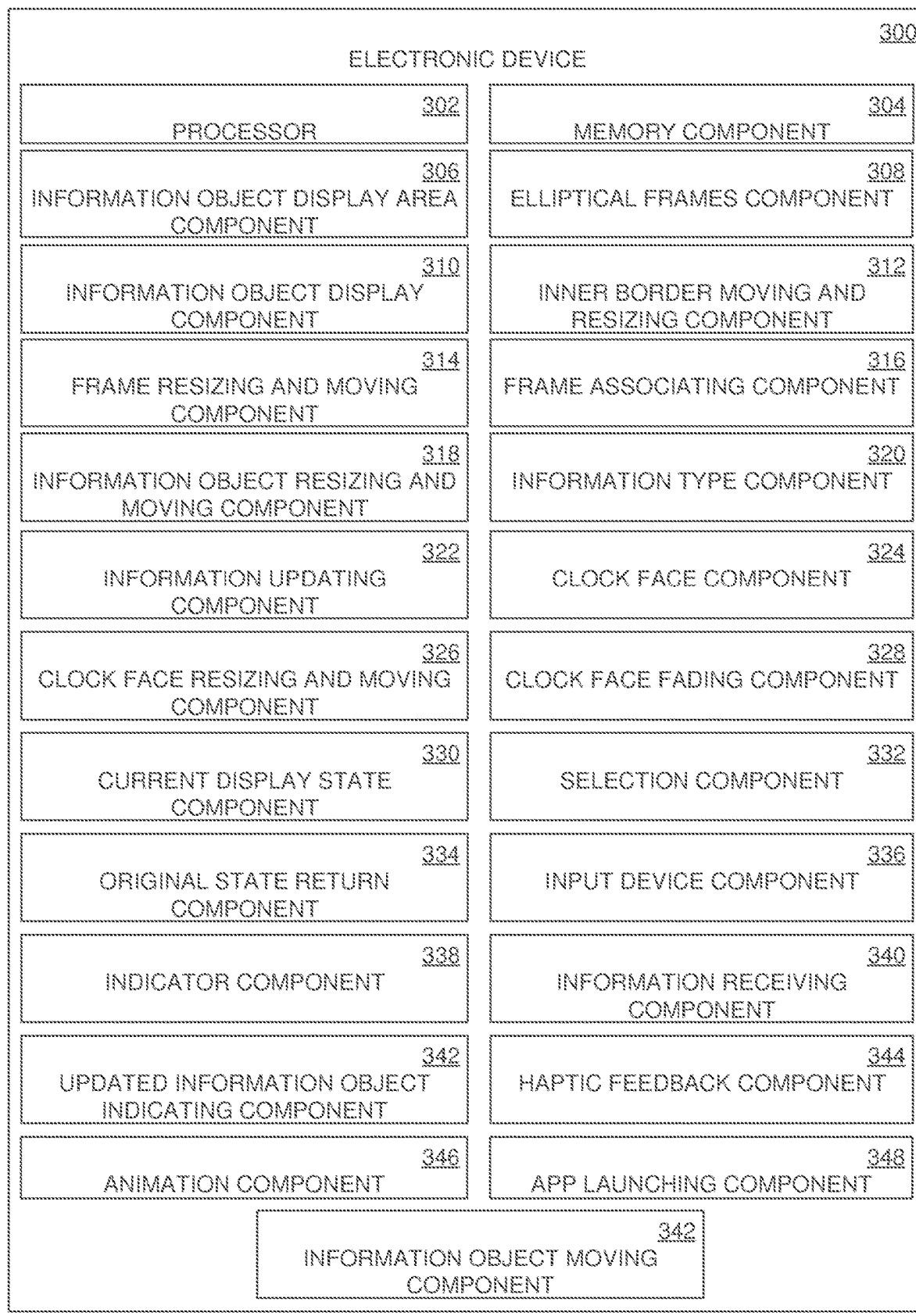
FIG. 17 is a block diagram illustrating logical components of an embodiment of a user interface according to the invention.

Various components may be provided for implementing the method described above with reference to FIG. 16. FIG. 17 is a block diagram which illustrates exemplary logical components which may be provided by an electronic device (300) hosting the user interface according to an embodiment of the invention.

The electronic device may include a processor (302) for executing the functions of components described below, which may be provided by hardware or by software units executing on the electronic device. The software units may be stored in a memory component (304) and instructions may be provided to the processor (302) to carry out the functionality of the described components. Some or all of the components may be provided by a software application downloadable onto and executable on the electronic device (302).

The user interface may include an information object display area component (306) arranged to provide an information object display area for displaying a plurality of information objects on a track, the track extending along a path created between an outer elliptical border and an inner elliptical border in the user interface, with the inner border lying within the outer border. An elliptical frames component (308) may be provided and may be arranged to provide a plurality of elliptical frames along the track, each frame in contact with the outer border, the inner border, a first neighboring frame adjacent it and in a first direction along the track, and a second neighboring frame adjacent it and in an opposite, second direction along the track.

An information object display component (310) may be adapted to display one or more information objects, each based on and associated with one of the elliptical frames. An inner border moving and resizing component (312) may be adapted to, responsive to receiving user input associated with movement of a pointer in the user interface, move the center of the inner elliptical border in the direction of movement of the pointer while resizing the inner border so that it remains within the outer border. A frame resizing and moving component (314) may be adapted to, responsive to moving and resizing the inner border, resize the frames and moving at least some of the frames along the track so that all the frames remain in contact with the inner border, outer border, first neighboring frame and second neighboring frame.

A frame associating component (316) may be adapted to associate each of the frames with a specific location on the track in an original condition of the user interface. The frame resizing and moving component (314) may further be adapted to resize and move the frames so that a point in the information object display area along the outer border and opposite the center of the inner border from the center of the outer border is in the same location as in the original condition of the user interface.

An information object resizing and moving component (318) may be adapted to resize and move information object corresponding to resizing and movement of its frame, while an information type component (320) may be adapted to display different types of information based on the size of an information object. An information updating component (322) may be adapted to update the displayed information once an information object is resized to a predetermined size associated with a specific type of information.

The inner border moving and resizing component (312) may further be adapted to move the inner border so that its center lies on the pointer. A clock face component (324) may be provided and may be adapted to provide a clock face in the user interface, the clock face associating with the inner border. A clock face resizing and moving component (326) may be adapted to move and resize the clock face with the inner border. A clock face fading component (328) may be provided and may be adapted to fade the clock face out of view during movement and resizing of the central display region.

A current display state component (330) may be adapted to keep the display in a current display state when the pointer is removed from the display, at least for a predetermined period of time. A selection component (332) may be adapted to, responsive to a selection action being performed on an information object, select that information object.

An original state return component (334) may be adapted to return the display region to an original state after a predetermined period of non-interaction therewith, or at a predetermined rate after removal of the pointer from the display.

An input device component (336) may be adapted to receive the input from an input device. An indicator component (338) may be adapted to display an indicator within the inner border. The indicator may indicate what point in the information object display area along the outer border and opposite the center of the inner border from the center of the outer border is in the same location as in the original condition of the user interface.

An information receiving component (340) may be adapted to receive updated information relating to an information object, while an updated information object indicating component (342) may be adapted to indicate which information object has been updated. A haptic feedback component (344) may be adapted to provide haptic feedback to a user in response to an information object being updated.

An animation component (346) may be adapted to animate an information object to maximize from its position when selected, after which it may grow until it covers the entire display or the area enclosed by the border of the display area, while an application launching component (348) may be adapted to launch an application associated with a selected information object on the electronic device (300) associated with the user interface, or on a parent device associated with the electronic device (300) of the user interface.

An information object moving component (350) may be adapted to, responsive to a user performing an information object moving action, allow the user to move the information object to a desired location along the track, where after it may associate the information object with the desired location.

Figure 18:
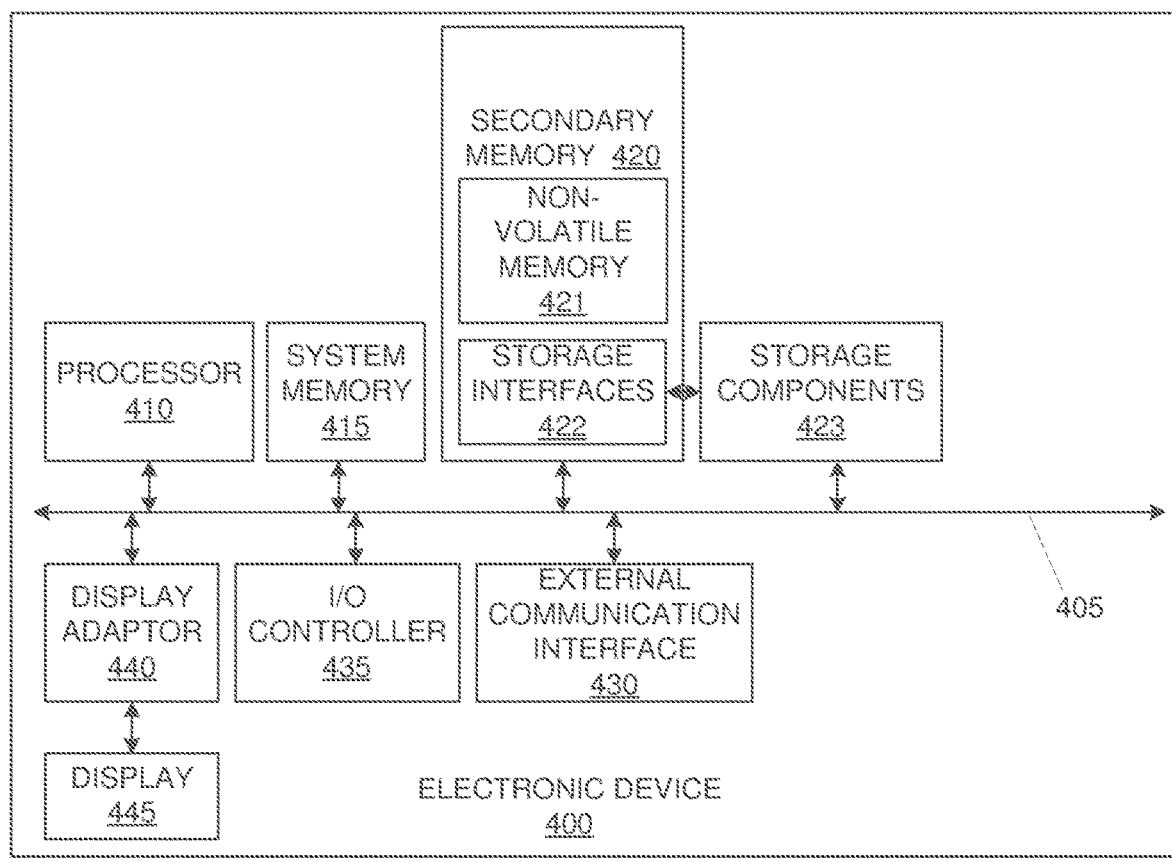
FIG. 18 illustrates an example of a computing device in which various aspects of the disclosure may be implemented.

FIG. 18 illustrates an example of an electronic device (400) in which various aspects of the disclosure may be implemented. The electronic device (400) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The electronic device (400) may be suitable for storing and executing computer program code. The various participants and elements in the previously described system diagrams may use any suitable number of subsystems or components of the electronic device (400) to facilitate the functions described herein. The electronic device (400) may include subsystems or components interconnected via a communication infrastructure (405) (for example, a communications bus, a network, etc.). The electronic device (400) may include one or more processors (410) and at least one memory component in the form of computer-readable media. The one or more processors (410) may include one or more of: CPUs, graphical processing units (CPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (400) may be distributed over a number of physical locations (e.g. in a distributed, cluster or cloud-based computing configuration) and appropriate software units may be arranged to manage and/or process data on behalf of remote devices.

The memory components may include system memory (415), which may include read only memory (ROM) and random access memory (RAM). A basic input/output system (BIOS) may be stored in ROM. System software may be stored in the system memory (415) including operating system software. The memory components may also include secondary memory (420). The secondary memory (420) may be non-volatile memory that may include a fixed disk (421), such as a hard disk drive, and, optionally, one or more storage interfaces (422) for interfacing with storage components (423), such as removable storage components (e.g. magnetic tape, optical disk, flash memory drive, external hard drive, solid-state drive, removable memory chip, etc.), network attached storage components (e.g. NAS drives), remote storage components (e.g. cloud-based storage) or the like.

The electronic device (400) may include an external communications interface (430) for operation of the electronic device (400) in a networked environment enabling transfer of data between multiple electronic devices (400) and/or the Internet. Data transferred via the external communications interface (430) may be in the form of signals, which may be electronic, electromagnetic, optical, radio, or other types of signal. The external communications interface (430) may enable communication of data between the electronic device (400) and other electronic devices including servers and external storage facilities. Web services may be accessible by and/or from the computing device (400) via the communications interface (430).

The external communications interface (430) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry. The external communications interface (430) may include a subscriber identity module (SIM) in the form of an integrated circuit that stores an international mobile subscriber identity and the related key used to identify and authenticate a subscriber using the electronic device (400). One or more subscriber identity modules may be removable from or embedded in the electronic device (400).

The computer-readable media in the form of the various memory components may provide storage of computer-executable instructions, data structures, program modules, software units and other data. A computer program product may be provided by a computer-readable medium having stored computer-readable program code executable by the central processor (410). A computer program product may be provided by a non-transient computer-readable medium, or may be provided via a signal or other transient means via the communications interface (430).

Interconnection via the communication infrastructure (405) allows the one or more processors (410) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the electronic device (400) either directly or via an I/O controller (435). One or more displays (445) (which may be touch-sensitive displays) may be coupled to or integrally formed with the electronic device (400) via a display (445) or video adapter (440).

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™ C++, or Perl™ using, for example, conventional or object-oriented techniques. The computer program code may be stored as a series of instructions, or commands on a non-transitory computer-readable medium, such as a random-access memory (RAM), a read-only memory (ROM), a magnetic medium such as a hard-drive, a solid-state drive (SSD), or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A computer program product comprising a non-transitory computer readable storage medium having instructions encoded thereon that, when executed by a processor, cause the processor to perform, at a user interface, the steps of:
   displaying an information object display area including a plurality of information objects on a track, the track extending along a path created between an outer elliptical border and an inner elliptical border in the user interface, with the inner elliptical border lying within the outer elliptical border and not intersecting with the outer elliptical border, where a ratio of a radius of the outer elliptical border and a radius of the inner elliptical border is constrained by a number of the plurality of information objects;
   generating a plurality of elliptical frames arranged in a chain along the track, each elliptical frame in contact with the outer elliptical border and the inner elliptical border;
   displaying one or more information objects each based on one of the elliptical frames;
   in response to receiving a static user input associated with placing a single pointer at a first position on the user interface, where the first position is offset from a center of the outer elliptical border, simultaneously performing the following steps:
      (1) immediately moving a center of the inner elliptical border to a position determined based on the first position;
      (2) immediately resizing the inner elliptical border based on the movement of the center of the inner elliptical border;
      (3) immediately resizing the plurality of elliptical frames based on the resizing of the inner elliptical border; and
      (4) immediately moving the position of at least some of the elliptical frames on the track; and
   in response to receiving further user input associated with continuous movement of the single pointer in the user interface, simultaneously performing the following steps:
      (5) continuously moving a center of the inner elliptical border;
      (6) continuously resizing the inner elliptical border;
      (7) continuously resizing the plurality of elliptical frames; and
      (8) continuously moving at least some of the elliptical frames along the track;
   wherein during the simultaneous performance of steps (1) to (4) and during the simultaneous performance of steps (5) to (8):

i) each elliptical frame remains (a) in contact with the inner elliptical border, and (b) in contact with the outer elliptical border;
ii) the elliptical frames remain arranged in a chain along the track;
iii) the outer elliptical border is kept in a same position and a same size in the user interface;
iv) the inner elliptical border remains within the outer elliptical border and does not intersect the outer elliptical border; and
v) all the plurality of elliptical frames are displayed in the information object display area with the number of displayed elliptical frames staying the same.

2. The computer program product as claimed in claim 1 wherein each of the elliptical frames are associated with a specific location on the track in an original condition of the user interface.

3. The computer program product as claimed in claim 2 wherein the step of resizing and moving at least some of the elliptical frames is performed so that elliptical frames that lie along a straight line between the center of the inner elliptical border and a center of the outer elliptical border are in the same location along the track as in the original condition of the user interface.

4. The computer program product as claimed in claim 1 wherein the track is an elliptical track and wherein centers of the elliptical frames are located on the track.

5. The computer program product as claimed in claim 1 wherein each of the one or more information objects are within one of the elliptical frames, and wherein an information object resizes and moves corresponding to resizing and movement of the elliptical frame in which the information object is within.

6. The computer program product as claimed in claim 5 wherein different types of information are displayed within the information object based on a size of the information object, and wherein the method further includes the step of updating the type of information displayed within the information object once the information object is resized to a predetermined size associated with a specific type of information.

7. The computer program product as claimed in claim 1 wherein the step of moving the center of the inner elliptical border includes moving the inner elliptical border in the direction of movement of the pointer.

8. The computer program product as claimed in claim 1 wherein the inner elliptical border includes a clock face that moves and resizes with the inner elliptical border or fades out during movement and resizing of the inner elliptical border.

9. The computer program product as claimed in claim 1 wherein the information object display area is configured to return to an original state in response to receiving no interaction for at least a predetermined period or to return to the original state at a predetermined rate after removal of the pointer from the display.

10. The computer program product as claimed in claim 1 wherein the information object display area is hidden in an original state of the display and is displayed in response to receiving the user input.

11. The computer program product as claimed in claim 1 wherein the track, the outer elliptical border, the inner elliptical border and the plurality of elliptical frames are hidden from view on the user interface while the plurality of information objects are displayed.

12. The computer program product as claimed in claim 1 wherein the non-transitory computer readable storage medium further has instructions encoded thereon that, when executed by the processor, cause the processor to perform the step of receiving updated information relating to an information object and indicating what information object has been updated.

13. The computer program product as claimed in claim 1 wherein an information object is animated to maximize from its position when selected and wherein the information object is animated to its previous position in its elliptical frame when a return function is selected.

14. The computer program product as claimed in claim 1 wherein the non-transitory computer readable storage medium further has instructions encoded thereon that, when executed by the processor, cause the processor to perform the step of, responsive to a selection action being performed on an information object, launching an application associated with the information object on an electronic device associated with the user interface or on another device associated with the electronic device.

15. The computer program product as claimed in claim 1 wherein the information objects define main hierarchy headings, with selection of an information object causing replacement of the information objects on the display with sub-heading information objects associated with a main hierarchy heading of the selected information object.

16. The computer program product as claimed in claim 15, wherein the non-transitory computer readable storage medium further has instructions encoded thereon, that when executed by a processor, cause the processor to perform the step of, responsive to receiving a return input while sub-heading information objects are displayed, causing replacement of the sub-heading information objects on the display with the information objects.

17. The computer program product as claimed in claim 1 wherein the non-transitory computer readable storage medium further has instructions encoded thereon, that when executed by a processor, cause the processor to perform the steps of, responsive to a user performing an information object moving action, allowing the user to move the information object to a desired location on the track, and associating the information object with the desired location.

18. A device comprising:
a processor configured to execute computer code including one or more components that include a series of instructions stored on a non-transitory computer readable medium, the one or more components including:
an information object display area component for displaying a plurality of information objects on a track, the track extending along a path created between an outer elliptical border and an inner elliptical border in a user interface, with the inner elliptical border lying within the outer elliptical border and not intersecting with the outer elliptical border, where a ratio of a radius of the outer elliptical border and a radius of the inner elliptical border is constrained by a number of the plurality of information objects;
an elliptical frames component for generating a plurality of elliptical frames arranged in a chain along the track, each elliptical frame in contact with the outer elliptical border and the inner elliptical border; and
an information object display component for displaying one or more information objects each based on one of the elliptical frames;
an inner border and frame moving and resizing component for, in response to receiving a static user input associated with placing a single pointer at a first position on the user interface, where the first position is offset from a center of the outer elliptical border, simultaneously performing the following steps:
(1) immediately moving a center of the inner elliptical border to a position determined based on the first position;
(2) immediately resizing the inner elliptical border based on the movement of the center of the inner elliptical border;
(3) immediately resizing the plurality of elliptical frames based on the resizing of the inner elliptical border; and
(4) immediately moving the position of at least some of the elliptical frames on the track;

and in response to receiving further user input associated with continuous movement of the single pointer in the user interface, simultaneously performing the following steps:
(5) continuously moving a center of the inner elliptical border;
(6) continuously resizing the inner elliptical border
(7) continuously resizing the plurality of elliptical frames; and
(8) continuously moving at least some of the elliptical frames along the track;

wherein during the simultaneous performance of steps (1) to (4) and during the simultaneous performance of steps (5) to (8):
i) each elliptical frame remains (a) in contact with the inner elliptical border, and (b) in contact with the outer elliptical border,
ii) the elliptical frames remain arranged in a chain along the track;
iii) the outer elliptical border is kept in a same position and a same size in the user interface;
iv) the inner elliptical border remains within the outer elliptical border and does not intersect the outer elliptical border; and
v) all the plurality of elliptical frames are displayed in the information object display area with the number of displayed elliptical frames staying the same.

19. A device as claimed in claim 18 wherein the device is a smartwatch and the user interface is a round, touch-sensitive display of the smartwatch.

20. A method for display and interaction in a user interface, the method comprising the steps of:
displaying an information object display area including a plurality of information objects on a track, the track extending along a path created between an outer elliptical border and an inner elliptical border in the user interface, with the inner elliptical border lying within the outer elliptical border and not intersecting with the outer elliptical border, where a ratio of a radius of the outer elliptical border and a radius of the inner elliptical border is constrained by a number of the plurality of information objects;
generating a plurality of elliptical frames arranged in a chain along the track, each elliptical frame in contact with the outer elliptical border and the inner elliptical border;
displaying one or more information objects each based on one of the elliptical frames;
in response to receiving a static user input associated with placing a single pointer at a first position on the user interface, where the first position is offset from a center of the outer elliptical border, simultaneously performing the following steps:
(1) immediately moving a center of the inner elliptical border to a position determined based on the first position;
(2) immediately resizing the inner elliptical border based on the movement of the center of the inner elliptical border;
(3) immediately resizing the plurality of elliptical frames based on the resizing of the inner elliptical border; and
(4) immediately moving the position of at least some of the elliptical frames on the track; and in response to receiving further user input associated with continuous movement of the single pointer in the user interface, simultaneously performing the following steps:
(5) continuously moving a center of the inner elliptical border;
(6) continuously resizing the inner elliptical border;
(7) continuously resizing the plurality of elliptical frames; and
(8) continuously moving at least some of the elliptical frames along the track;

wherein during the simultaneous performance of steps (1) to (4) and during the simultaneous performance of steps (5) to (8):
i) each elliptical frame remains (a) in contact with the inner elliptical border, and (b) in contact with the outer elliptical border;
ii) the elliptical frames remain arranged in a chain along the track;
iii) the outer elliptical border is kept in a same position and a same size in the user interface;
iv) the inner elliptical border remains within the outer elliptical border and does not intersect the outer elliptical border; and
v) all the plurality of elliptical frames are displayed in the information object display area with the number of displayed elliptical frames staying the same.

* * * * *